United States Patent
Iura et al.

(10) Patent No.: US 7,423,395 B2
(45) Date of Patent: Sep. 9, 2008

(54) SENSORLESS VECTOR CONTROL METHOD FOR ALTERNATING-CURRENT MOTOR AND CONTROL APPARATUS THEREFOR

(75) Inventors: Hideaki Iura, Fukuoka (JP); Kazuhiro Nonaka, Fukuoka (JP); Yuichi Terazono, Fukuoka (JP); Yoichi Yamamoto, Fukuoka (JP); Satoshi Sueshima, Fukuoka (JP); Katsushi Terazono, Fukuoka (JP); Mitsujiro Sawamura, Fukuoka (JP)

(73) Assignee: Kabushiki Kaisha Yaskawa Denki, Tokyo (JP)

( * ) Notice: Subject to any disclaimer, the term of this patent is extended or adjusted under 35 U.S.C. 154(b) by 792 days.

(21) Appl. No.: 10/520,467

(22) PCT Filed: Jul. 2, 2003

(86) PCT No.: PCT/JP03/08423

§ 371 (c)(1),
(2), (4) Date: Jan. 7, 2005

(87) PCT Pub. No.: WO2004/006424

PCT Pub. Date: Jan. 15, 2004

(65) Prior Publication Data

US 2006/0049795 A1    Mar. 9, 2006

(30) Foreign Application Priority Data

| Jul. 8, 2002 | (JP) | ............................. 2002-198712 |
| Oct. 30, 2002 | (JP) | ............................. 2002-315777 |
| Apr. 25, 2003 | (JP) | ............................. 2003-121733 |

(51) Int. Cl.
*H02P 21/00* (2006.01)

(52) U.S. Cl. .................. 318/400.02; 318/432; 318/434; 318/708

(58) Field of Classification Search ............ 318/400.02, 318/432, 434, 708
See application file for complete search history.

(56) References Cited

U.S. PATENT DOCUMENTS 6,163,127 A    12/2000   Patel et al.

(Continued)

FOREIGN PATENT DOCUMENTS

JP        6-133584 A    5/1994

(Continued)

OTHER PUBLICATIONS

Hangwen Pan, et al., "Improving the Start and Restart Behavior Through State Recognition of AC Drives", Proceedings of the Power Conversion Conference—Nagaoka 1997, vol. 2, Aug. 1997, XP002340454.

*Primary Examiner*—Lincoln Donovan
*Assistant Examiner*—Erick Glass
(74) *Attorney, Agent, or Firm*—Sughrue Mion, PLLC

(57) ABSTRACT

It is the objective of the present invention to provide a sensorless vector control method and a control apparatus, for an alternating-current motor, that can smoothly restart an alternating-current motor in the free running state.

According to the present invention, when a current that flows in an alternating-current motor (2) at a restart time 7 the alternating-current motor (2) continuously flows at a designated current level or higher for a designated period of time, it is determined that the rotational direction or the velocity of the alternating-current motor (2) is incorrectly estimated, and a direct current or a direct-current voltage is again applied to again estimate the rotational direction and the velocity.

28 Claims, 10 Drawing Sheets

U.S. PATENT DOCUMENTS

| | | | |
|---|---|---|---|
| 6,396,229 B1 * | 5/2002 | Sakamoto et al. | 318/400.02 |
| 7,045,988 B2 * | 5/2006 | Ha et al. | 318/807 |
| 7,230,403 B2 * | 6/2007 | Ho | 318/400.04 |
| 2007/0018606 A1 * | 1/2007 | Iura et al. | 318/807 |

FOREIGN PATENT DOCUMENTS

| | | |
|---|---|---|
| JP | 7-46856 A | 2/1995 |
| JP | 10-23793 A | 1/1998 |
| JP | 2000-153506 A | 9/2000 |
| JP | 2001-161094 A | 6/2001 |
| JP | 1221765 A1 | 7/2002 |

* cited by examiner

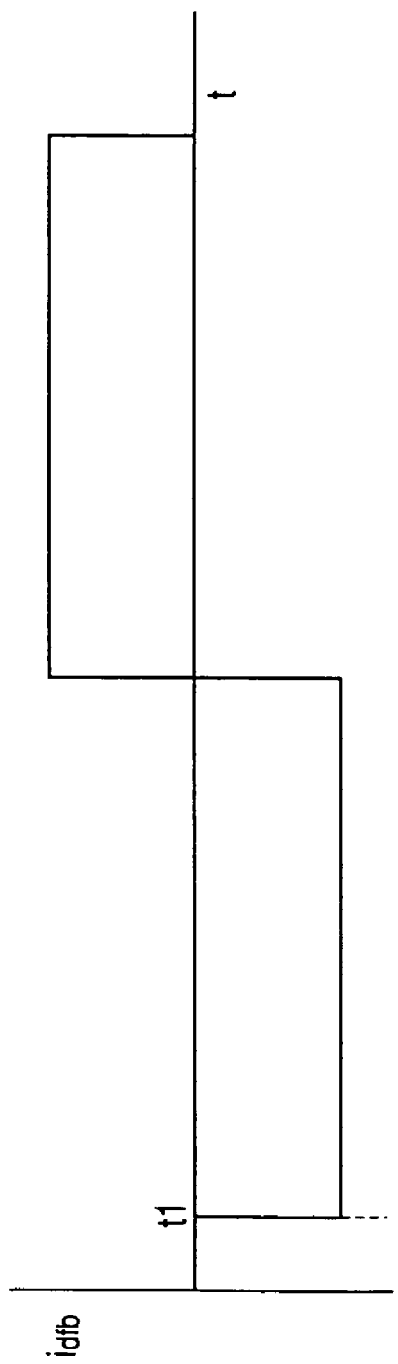
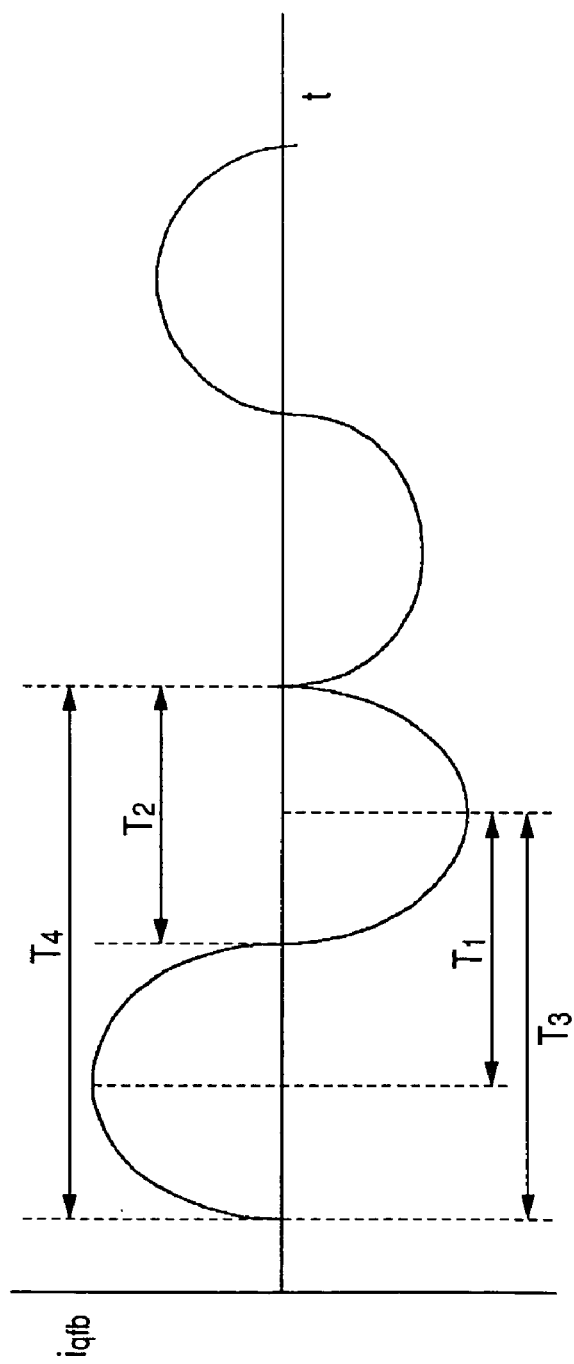
FIG. 4(a)
FIG. 4(b)

SENSORLESS VECTOR CONTROL METHOD FOR ALTERNATING-CURRENT MOTOR AND CONTROL APPARATUS THEREFOR

TECHNICAL FIELD

The present invention relates to a sensorless vector control method, for an alternating-current motor, whereby, before an alternating-current is started, the velocity of the alternating-current motor in the free running state is estimated and the alternating-current motor is operated at the estimated velocity to provide a smooth start, and to a control apparatus therefor.

BACKGROUND ART

Submitted by the present inventor and described in JP-A-2001-161094 is a control method, for an alternating-current motor, whereby are provided a power converter, for outputting power to the alternating-current motor, and a current controller, for controlling the current output by the power converter based on a signal indicating a deviation between a current instruction signal and a detection signal indicating the current output by the power converter, and whereby a velocity detector and a voltage detector are not provided. According to this control method, provided are the power converter, for outputting power to the alternating-current motor, and the power controller, for controlling the current output by the power converter based on a signal indicating a deviation between a current instruction signal and a detection signal indicating the current output by the power converter, and when the alternating-current motor is in the free running state, an arbitrary direct current is supplied for a designated period of time, a frequency component that appears in the detection signal for the power output by the power converter is detected, and the velocity of the alternating-current motor is estimated based on the frequency component.

Also disclosed is a control method whereby, when an alternating-current motor is in the free running state, a current instruction signal described above is forcibly set to zero so as to adjust to zero the current for the alternating-current motor; and whereby the level of the remaining voltage, the phase and the angular velocity of the alternating-current motor are obtained based on an output voltage instruction signal that is obtained by using a calculation employing the current output by the current controller, and then, the rotational direction and the velocity of the alternating-current motor in the free running state are estimated, so that the alternating-current motor can be smoothly started in the free running state.

Furthermore, disclosed is a control method whereby, when an output voltage instruction signal, which is obtained by using a calculation based on the output of the current controller when the current control is performed with a current instruction signal of zero, is lower than an arbitrarily designated voltage level, the current control is halted and an instruction for a direct current having an arbitrary level is transmitted in an arbitrary direction for a designated period of time, and thereafter, an instruction for a current having an arbitrary level is transmitted in a direction for which the phase differs by 180° from the direction in which the direct current instruction is transmitted; whereby the current control is again performed for a designated period of time, and the frequency component that appears in the detected current value and the phase relationship are detected; and whereby the frequency component is estimated to be the velocity of the alternating-current motor and the rotational direction is estimated based on the phase relationship.

However, according to the method described in JP-2001-161094, when a residual high voltage remains in the alternating-current motor, a velocity differing greatly from the actual velocity of the alternating-current motor would be estimated to be due to the averse affect of the residual voltage. In this case, when the alternating-current motor is started while a frequency corresponding to the estimated velocity is designated for the power converter, a large current flows that produces a velocity near the velocity erroneously detected for the alternating-current motor, and the alternating-current motor can not smoothly be restarted.

When a response from the current controller is not satisfactory, it is difficult for the current of the alternating-current motor to be set to zero, the power converter falls into an overcurrent state, and the alternating-current motor can not smoothly be started.

Further, when the alternating-current motor is an induction motor, it is easy for the current of the induction motor to be reduced to zero because the residual voltage in the free running state is gradually reduced. But when the alternating-current motor is a permanent magnet synchronous motor, a high inductive voltage is generated in the free running state at a high velocity, and it is not easy for the current of the permanent magnet synchronous motor to be set to zero.

Furthermore, when the alternating-current motor is in the free running state at a high velocity, the detection resolution for a frequency that appears in a detected current value, or the amplitude of the signal of a frequency component that appears in a detected current value is reduced, so that the frequency can not be detected.

In addition, according to the control method for an alternating-current motor described in JP-A-2001-161094, when the alternating-current motor is in the free running state, an arbitrary direct current is supplied for a designated period of time. However, no specific explanation is given for the method for determining the designated period of time.

According to a control method for an alternating-current motor described in Japanese Patent Application No. 2002-80891, a predesignated frequency and a rotational direction that is detected are set for a frequency adjustment circuit, and when an input torque current detection value is positive, the output frequency is lowered, or when the torque current detection value is negative, the output frequency is increased. When the output frequency is adjusted in this manner, so that it nears the torque current detection value of 0, the output frequency of the alternating-current motor in the free running state can match the output frequency of the power converter, so that a smooth start is obtained.

However, in this case also, the alternating-current motor is not always smoothly restarted, even though the output frequency is adjusted so that it nears the torque current detection value of 0.

Therefore, in order to resolve these shortcomings, it is a first objective of the present invention to provide a sensorless vector control method for an alternating-current motor, whereby when a wrong rotational direction or a wrong velocity is estimated when restarting the alternating-current motor in the free running state, this can be determined to be an erroneous estimate and the alternating-current motor in the free running state can be smoothly restarted, and whereby when an alternating-current motor in the free running state is to be restarted, a period for the application of a direct current to the alternating-current motor is correctly designated, so that the alternating-current motor in the free running state can be smoothly restarted; and a control apparatus therefor.

It is a second objective of the present invention to provide a sensorless vector control method for an alternating-current motor, whereby a running operation can still be smoothly and appropriately continued when a response by a current controller is poor, or when the alternating-current motor is an induction alternating-current motor, or even a permanent magnet synchronous alternating-current motor; and a control apparatus therefor.

It is a third objective of the present invention to provide a sensorless vector control method for an alternating-current motor, whereby the following three points can be satisfied: when, after a current instruction signal is set to zero in order to adjust the current for the alternating-current motor to zero, current control is implemented to increase the response of a current controller and to avoid the entry into an overcurrent state of a power converter, so that the run-time operation can be smoothly continued; when, after an estimated velocity and rotational direction for the alternating-current motor are employed to provide a direct-current instruction for the alternating-current motor, the accuracy of the detection of a frequency is increased for the alternating-current motor in the free running state at a high velocity; and when the run-time operation continues smoothly even while the alternating-current motor is in the free running state at a high velocity; and to provide a control apparatus therefor.

DISCLOSURE OF THE INVENTION

To achieve the above objectives, according to claim 1 of the present invention, a sensorless vector control method for an alternating-current motor, the sensorless vector control method employing:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting the exciting current detection value and the torque current detection value, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, and a velocity detector and a voltage detector are not provided, and whereby a direct current or a direct-current voltage is applied to the alternating-current motor in a free running state before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, and the frequency adjustment circuit matches an output frequency with the velocity of the alternating-current motor, is characterized by:

estimating, based on the level of a current flowing in the alternating-current motor, that the rotational direction and the frequency designated for the frequency adjustment circuit deviate from the actual rotational direction and the actual velocity of the alternating-current motor.

According to claim 2 of the invention, the sensorless vector control method for an alternating-current motor, described in claim 1, is characterized in that a case that the level of the current flowing in the alternating-current motor is continued for a designated period of time, at an equal to or higher than designated current level, is established as a reference that is used to estimate that the rotational direction and the frequency designated for the frequency adjustment circuit deviate from the actual rotational direction and the actual velocity of the alternating-current motor.

According to claim 3 of the invention, the sensorless vector control method for an alternating-current motor, cited in claim 1 or 2, is characterized by:

after it is estimated that the rotational direction and the frequency designated to the frequency adjustment circuit deviate from the actual rotational direction and the actual velocity of the alternating-current motor;

halting a restarting of the alternating-current motor;

applying a direct current or a direct-current voltage to the alternating-current motor;

employing a secondary current, flowing at the application time, to estimate, again, the rotational direction and the velocity of the alternating-current motor; and setting again, to the frequency adjustment circuit, a frequency that corresponds to the rotational direction and the velocity, and restarting the alternating-current motor.

According to claim 4 of the invention, the sensorless vector control method for an alternating-current motor, cited in claim 3, is characterized by:

when a direct current or a direct-current voltage is applied to the alternating-current motor, and a secondary current flowing at the application time is employed to reevaluate the rotational direction and the velocity of the alternating-current motor, while the velocity is estimated such that the upper limit value for an estimated value is lower by a designated velocity value than the velocity is previously estimated to be, or is equal to the final output value of the frequency adjustment circuit; and a frequency that corresponds to the estimated value is set to the frequency adjustment circuit, and the alternating-current motor is started.

According to claim 5 of the invention, a sensorless vector control apparatus, for an alternating-current motor, including:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting the exciting current detection value and the torque current detection value, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, and a direct current or a direct-current voltage is applied to the alternating-current motor in a free running state before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, and the frequency adjustment circuit matches an output frequency with the velocity of the alternating-current motor, is characterized by including:

erroneous setup estimation member for estimating, based on the level of a current flowing in the alternating-current motor, that the rotational direction and the frequency designated for the frequency adjustment circuit deviate from the actual rotational direction and the actual velocity of the alternating-current motor.

According to claim 6 of the invention, the sensorless vector control apparatus for an alternating-current motor, described in claim 5, is characterized in that a case that the level of the current flowing in the alternating-current motor is continued for a designated period of time, at an equal to or higher than designated current level, is established as a reference that is used by the erroneous setup estimation member to estimate that the rotational direction and the frequency designated for the frequency adjustment circuit deviate from the actual rotational direction and the actual velocity of the alternating-current motor.

According to claim 7 of the invention, the sensorless vector control apparatus for an alternating-current motor, cited in claim 5 or 6, is characterized by:

after the erroneous setup estimation member estimates a setup is incorrect, a restarting of the alternating-current motor is halted;

a direct current or a direct-current voltage is again applied to the alternating-current motor;

a secondary current, flowing at the application time, is employed to reevaluate the rotational direction and the velocity of the alternating-current motor; and a frequency that corresponds to the rotational direction and the velocity is again set to the frequency adjustment circuit, and the alternating-current motor is restarted.

According to claim 8 of the invention, the sensorless vector control apparatus for an alternating-current motor, cited in claim 7, is characterized by:

when a direct current or a direct-current voltage is applied to the alternating-current motor, and a secondary current flowing at the application time is employed to reevaluate the rotational direction and the velocity of the alternating-current motor, while estimating the velocity is such that the upper limit value for an estimated value is lower by a designated velocity value than the velocity is previously estimated to be, or is equal to the final output value of the frequency adjustment circuit; and a frequency that corresponds to the estimated value and starting the alternating-current motor is set for the frequency adjustment circuit.

According to claim 9 of the invention, a sensorless vector control method for an alternating-current motor, employing:

the sensorless vector control method employing:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting the exciting current detection value and the torque current detection value, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, whereby a direct current or a direct-current voltage is applied to the alternating-current motor in a free running state before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, and the frequency adjustment circuit matches an output frequency with the velocity of the alternating-current motor, is characterized by:

setting, as a period of time for applying a direct current or a direct-current voltage, a greater value, either an estimated lower limit value for the alternating-current motor, or a value obtained based on a value designated as a secondary circuit time constant.

According to claim 10 of the invention, the sensorless vector control method for an alternating-current motor, cited in claim 9, is characterized by:

when the frequency of a secondary current is not obtained during the period in which the direct current or the direct-current voltage is being applied, it is determined that the alternating-current motor is halted; and a predesignated lowest frequency or a zero frequency is transmitted to the frequency adjustment circuit.

According to claim 11 of the present invention, a sensorless vector control apparatus, for an alternating-current motor, including:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting the exciting current detection value and the torque current detection value, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, and a direct current or a direct-current voltage is applied to the alternating-current motor in a free running state for a set time before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, the frequency adjustment circuit matches an output frequency with the velocity of the alternating-current motor, is characterized by:

setting, as a period of time for applying a direct current or a direct-current voltage, a greater value, either an estimated lower limit value for the alternating-current motor, or a value obtained based on a value designated as a secondary circuit time constant.

According to claim 12 of the invention, the sensorless vector control apparatus for an alternating-current motor, cited in claim 11, is characterized by:

when the frequency of a secondary current is not obtained during the period in which the direct current or the direct-current voltage is being applied, it is determined that the alternating-current motor is halted; and a predesignated lowest frequency or a zero frequency is transmitted to the frequency adjustment circuit.

According to claim 13 of the invention, a sensorless vector control method for an alternating-current motor, the sensorless vector control method employing:

a power converter, for outputting power to an alternating-current motor, and a current controller, for controlling a current output by the power converter based on a signal indicating a deviation between a current instruction signal and a detection signal for a current output by the power converter, wherein a velocity detector and a voltage detector are not provided, whereby current control is effected by forcibly setting the current instruction signal to zero so as to reduce to zero a current in the alternating-current motor in a free running state, and whereby a level and a phase of a residual voltage in the alternating-current motor, and an angular velocity, are calculated based on an output voltage instruction signal obtained by employing a current output by the current controller, and a rotational direction and velocity of the alternating-current motor in the free running state are estimated, is characterized by:

determining a wait time until the current control is started with the current instruction signal value set to zero in accordance with a run-time frequency of the power converter before the free running state and a secondary circuit time constant of the alternating-current motor.

According to claim 14 of the invention, the sensorless vector control method for an alternating-current motor, cited in claim 13, is characterized by:

when the run-time frequency of the power converter before the free running state is entered is lower than an arbitrarily designated frequency, setting the wait time until the current control is started with the current instruction signal value set to zero.

According to the claim 15 of the invention, for a sensorless vector control method for an alternating-current motor, the sensorless vector control method for an alternating-current motor, cited in claim 13 or 14, is characterized by:

when an induction voltage of the alternating-current motor is so high that it is difficult to adjust a current in the alternating-current motor to zero, halting the control for setting the current in the alternating-current motor to zero;

permitting an arbitrarily provided time-power converter to prepare switching so as to short-circuit three phases of an input to the alternating-current motor, exerting a damping force on the alternating-current motor;

decelerating the alternating-current motor;

controlling again, to zero, the current of the alternating-current motor; and estimating the rotational direction and the velocity of the alternating-current motor in the free running state.

According to claim 16 of the invention, a sensorless vector control apparatus for an alternating-current motor, including:

a power converter, for outputting power to an alternating-current motor, and a current controller, for controlling a current output by the power converter based on a signal indicating a deviation between a current instruction signal and a detection signal for a current output by the power converter, wherein a velocity detector and a voltage detector are not provided, current control is effected by forcibly setting the current instruction signal to zero so as to reduce to zero a current in the alternating-current motor in a free running state, and a level and a phase of a residual voltage in the alternating-current motor, and an angular velocity, are calculated based on an output voltage instruction signal obtained by employing a current output by the current controller, and a rotational direction and velocity of the alternating-current motor in the free running state are estimated, is characterized by:

determining a wait time until the current control is started with the current instruction signal value set to zero in accordance with a run-time frequency of the power converter before the free running state and a secondary circuit time constant of the alternating-current motor.

According to claim 17 of the invention, the sensorless vector control apparatus for an alternating-current motor, cited in claim 16, is characterized by:

when the run-time frequency of the power converter before the free running state is entered is lower than an arbitrarily designated frequency, setting the wait time until the current control is started with the current instruction signal value set to zero.

According to the claim 18 of the invention, for a sensorless vector control apparatus for an alternating-current motor, the sensorless vector control apparatus for an alternating-current motor, cited in claim 16 or 17, is characterized by:

when an induction voltage of the alternating-current motor is so high that it is difficult to adjust a current in the alternating-current motor to zero, halting the control for setting the current in the alternating-current motor to zero;

permitting an arbitrarily provided time-power converter to prepare switching so as to short-circuit three phases of an input to the alternating-current motor;

exerting a damping force on the alternating-current motor;

controlling again, to zero, the current of the alternating-current motor that is decelerated; and estimating the rotational direction and the velocity of the alternating-current motor in the free running state.

According to claim 19 of the invention, a sensorless vector control method for an alternating-current motor, the sensorless vector control method employing:

a power converter, for outputting power to an alternating-current motor, and a current controller, for controlling a current output by the power converter based on a signal indicating a deviation between a current instruction signal and a detection signal for a current output by the power converter, wherein both a velocity detector and a voltage detector are not provided, whereby a current control is performed by forcibly setting the current instruction signal to zero so as to reduce to zero a current in the alternating-current motor in a free running state, and whereby a level and a phase of a residual voltage in the alternating-current motor and an angular velocity are calculated based on an output voltage instruction signal obtained by employing a current output by the current controller, and then, a rotational direction and a velocity of the alternating-current motor in the free running state are estimated, is characterized by:

when a process for reducing to zero the current in the alternating-current motor is to be preformed, reducing a scanning period for a current control process to less than that for a normal control process.

According to claim 20 of the invention, the sensorless vector control method for an alternating-current motor, cited in claim 19, is characterized by:

when the process for reducing to zero the current in the alternating-current motor is to be preformed, reducing the scanning period for the current control process to less than that for the normal control process, as well as increasing a carrier frequency of the power converter.

According to claim 21 of the invention, a sensorless vector control apparatus for an alternating-current motor, including:

a power converter, for outputting power to an alternating-current motor, and a current controller, for controlling a current output by the power converter based on a signal indicating a deviation between a current instruction signal and a detection signal for a current output by the power converter, wherein a current control is performed by forcibly setting the current instruction signal to zero so as to reduce to zero a current in the alternating-current motor in a free running state, a level and a phase of a residual voltage in the alternating-current motor and an angular velocity are calculated based on an output voltage instruction signal obtained by employing a current output by the current controller, and then, a rotational direction and a velocity of the alternating-current motor in the free running state, and both a velocity detector and a voltage detector are not provided, is characterized by including:

member for, when a process for reducing to zero the current in the alternating-current motor is to be preformed, reducing a scanning period for a current control process to less than that for a normal control process.

According to claim 22 of the invention, the sensorless vector control apparatus for an alternating-current motor, cited in claim 21, is characterized by including:

member for, when the process for reducing to zero the current in the alternating-current motor is to be preformed, reducing the scanning period for the current control process to less than that for the normal control process, as well as increasing a carrier frequency of the power converter.

According to claim 23 of the invention, a sensorless vector control method for an alternating-current motor, the sensorless vector control method employing:

a power converter, for outputting power to an alternating-current motor, and a current controller, for controlling a current output by the power converter based on a signal indicating a deviation between a current instruction signal and a detection signal for a current output by the power converter, whereby current control is effected by forcibly setting the current instruction signal to zero so as to reduce to zero a current in the alternating-current motor in a free running state, whereby, when the current instruction signal, which is calculated by using a current output by the current controller, is lower than an arbitrarily designated voltage level, current control is halted, and a direct current instruction is transmitted at an arbitrary level for a designated period of time, whereby, thereafter, a current instruction is transmitted at an arbitrary level in a direction with a phase 180° different from the direction in which the direct-current voltage is transmitted, and the current control is performed again during a designated period of time, and whereby a velocity estimation circuit detects a frequency component that appears in a current detection value and a phase relationship thereof, estimates the frequency component as a velocity of the alternating-current motor, and employs the phase relationship to estimate a rotational direction of the alternating-current motor, both a velocity detector and a voltage detector are not provided, is characterized by:

when the velocity and the rotational direction of the alternating-current motor are estimated by providing a direct current instruction for the alternating-current motor, reducing a scanning time period for a current control process to less than that for a normal control process.

According to claim 24 of the invention, the sensorless vector control method for an alternating-current motor, cited in claim 23, is characterized by:

when the velocity and the rotational direction of the alternating-current motor are estimated by providing a direct current instruction for the alternating-current motor, reducing a scanning period of time for a current control process to less than that for a normal control process, as well as increasing a carrier frequency of the power converter.

According to claim 25 of the invention, the sensorless vector control method for an alternating-current motor, cited in claim 23 or 24, is characterized by:

when the velocity and the rotational direction of the alternating-current motor are estimated by providing a direct current instruction for the alternating-current motor, reducing a scanning period of time for a current control process to less than that for a normal control process, as well as employing a current detector that is different from that used for the normal control process and that is so sensitive a small current is detected.

According to claim 26 of the invention, a sensorless vector control apparatus for an alternating-current motor, including:

a power converter, for outputting power to an alternating-current motor, and a current controller, for controlling a current output by the power converter based on a signal indicating a deviation between a current instruction signal and a detection signal for a current output by the power converter, wherein current control is effected by forcibly setting the current instruction signal to zero so as to reduce to zero a current in the alternating-current motor in a free running state, when the current instruction signal, which is calculated by using a current output by the current controller, is lower than an arbitrarily designated voltage level, current control is halted, and a direct current instruction is transmitted at an arbitrary level in an arbitrary direction for a designated period of time, thereafter, a current instruction is transmitted at an arbitrary level in a direction with a phase 180° different from the direction in which the direct-current voltage is transmitted, and the current control is performed again during a designated period of time, and a velocity estimation circuit detects a frequency component that appears in a current detection value and a phase relationship thereof, estimates the frequency component as a velocity of the alternating-current motor, and employs the phase relationship to estimate a rotational direction of the alternating-current motor, so that both a velocity detector and a voltage detector are not provided, is characterized by including:

member for reducing a scanning time period for a current control process to less than that for a normal control process when the velocity and the rotational direction of the alternating-current motor are estimated by providing a direct current instruction for the alternating-current motor.

According to claim 27 of the invention, the sensorless vector control apparatus for an alternating-current motor, cited in claim 26, is characterized by further including:

when the velocity and the rotational direction of the alternating-current motor are estimated by providing a direct current instruction for the alternating-current motor, member for reducing a scanning period of time for a current control process to less than that for a normal control process, as well as increasing a carrier frequency of the power converter.

According to claim 28 of the invention, the sensorless vector control method for an alternating-current motor, cited in claim 26 or 27, is characterized by further including:

when the velocity and the rotational direction of the alternating-current motor are estimated by providing a direct current instruction for the alternating-current motor, a current detector for reducing a scanning period of time for a current control process to less than that for a normal control process, as well as employing a current detector that is different from that used for the normal control process and that is so sensitive a small current is detected.

BRIEF DESCRIPTION OF THE DRAWINGS

FIGS. 4(*a*) and 4(*b*) are graphs showing a change for the torque current detection value i qfb for a case wherein a direct current is supplied to the alternating-current motor, in the free running state, that is rotated at a low velocity;

Figure 1:
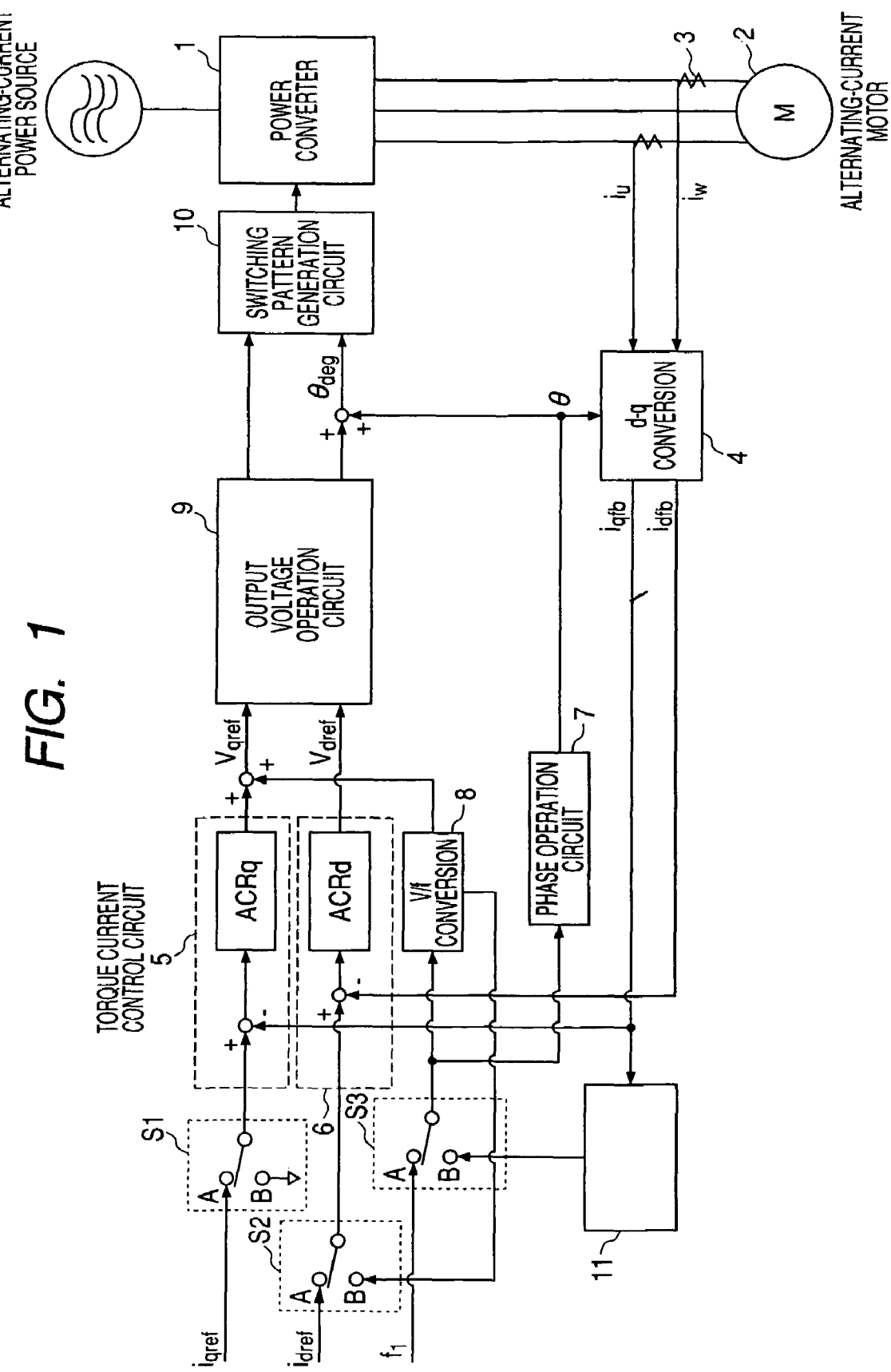
FIG. 1 is a block diagram showing the configuration of a sensorless vector control apparatus for an alternating-current motor according to a first embodiment of the present invention.

The reference numerals used in drawings are as follows:
1: power converter
2: alternating-current motor
3: current detector
4: current coordinates conversion circuit
5: torque current control circuit
6: exciting current control circuit
7: phase operation circuit
8: V/f conversion circuit
9: output voltage operation circuit
10: switching pattern generation circuit
11: frequency adjustment circuit
12, 13, 14, 17: switch
15: velocity estimation circuit (third embodiment)
15B: velocity estimation circuit (fourth embodiment)
16: adder

BEST MODES FOR CARRYING OUT THE INVENTION

The present invention will now be described while referring to the drawings.

First, a first embodiment of the present invention will now be explained.

According to the first embodiment, when an alternating-current motor is to be restarted, and when a current flowing in the alternating-current motor is continued at a designated current level or higher for a designated period of time, it is determined that a rotational direction or a velocity is incorrectly estimated for the alternating-current motor, and a direct current or a direct-current voltage is applied again to estimate the rotational direction and the velocity.

FIG. 1 is a block diagram showing the configuration of a sensorless vector control apparatus for an alternating-current motor according to the first embodiment of the present invention. For this embodiment, the sensorless vector control apparatus for an alternating-current motor includes: a power converter 1, an alternating-current motor 2, a current detector 3, a current coordinates conversion circuit 4, a torque current control circuit 5, an exciting current control circuit 6, a phase operation circuit 7, a V/f conversion circuit 8, an output voltage operation circuit 9, a switching pattern generation circuit 10 and a frequency adjustment circuit 11.

The power converter 1 employs the PWM control system to convert, into an alternating current having an arbitrary frequency and an arbitrary voltage, a direct-current voltage obtained by converting a three-phase alternating current using a power device, and supplies the alternating current to the alternating-current motor 2.

The current detector 3 detects a current supplied to the alternating-current motor 2.

The current coordinates conversion circuit 4 splits the current detected by the current detector 3 to obtain a torque current detection value i qfb and an exciting current detection value i dfb.

The torque current control circuit 5 calculates a first q-axial voltage instruction value V'qref so that a provided torque current instruction value i qref matches the torque current detection value i qfb.

The exciting current control circuit 6 calculates ad-axial voltage instruction value dref so that a provided exciting current instruction value i dref matches the exciting current detection value i dfb.

The phase operation circuit 7 integrates a provided frequency f1 to obtain a phase θ.

The V/f conversion circuit 8 employs the provided frequency f1 to calculate a voltage Eref that corresponds to an induction voltage for the alternating-current motor.

The output voltage operation circuit 9 obtains a second q-axial voltage instruction Vqref by adding the first q-axial voltage instruction value V'qref, which is the output of the torque current control circuit 5, to the voltage Eref, which is the output of the V/f conversion circuit 8, and outputs an output voltage instruction value V1ref and its voltage phase θV in accordance with the second q-axial voltage instruction value Vqref and the d-axial voltage instruction value dref.

The switching pattern generation circuit 10 determines a switching pattern for the power converter 1 based on the output voltage instruction value V1ref and a power converter output phase θdeg, which is obtained by adding the voltage phase θV and the phase θ.

The frequency adjustment circuit 11 is a circuit for adjusting the frequency output by the power converter 1, so that the alternating-motor current 2 in the free running state can be smoothly restarted.

For an estimation of the rotational direction and the velocity of the alternating-current motor 2 in the free running state, a direct current instruction is provided for the exciting current instruction value i dref during an arbitrarily designated period of time, then, the current control is performed by changing the sign and the level of the direct current instruction and the change in the torque current detection value i qfb is measured.

Figure 2A:
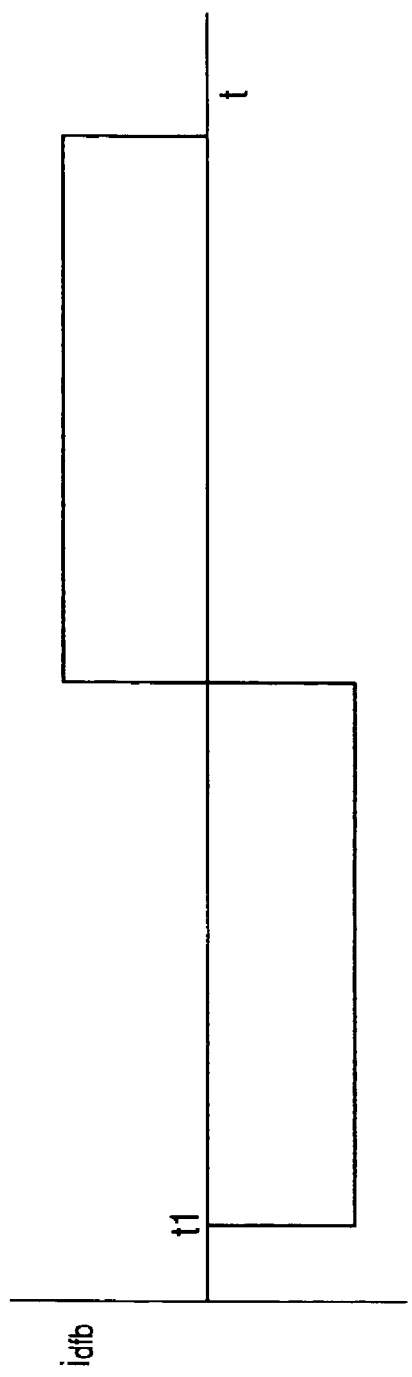
FIGS. 2(*a*) and 2(*b*) are graphs showing a change for a torque current detection value i qfb for a case wherein a direct current is supplied to an alternating-current motor, in the free running state, that is rotated in the forward direction.
Figure 2B:
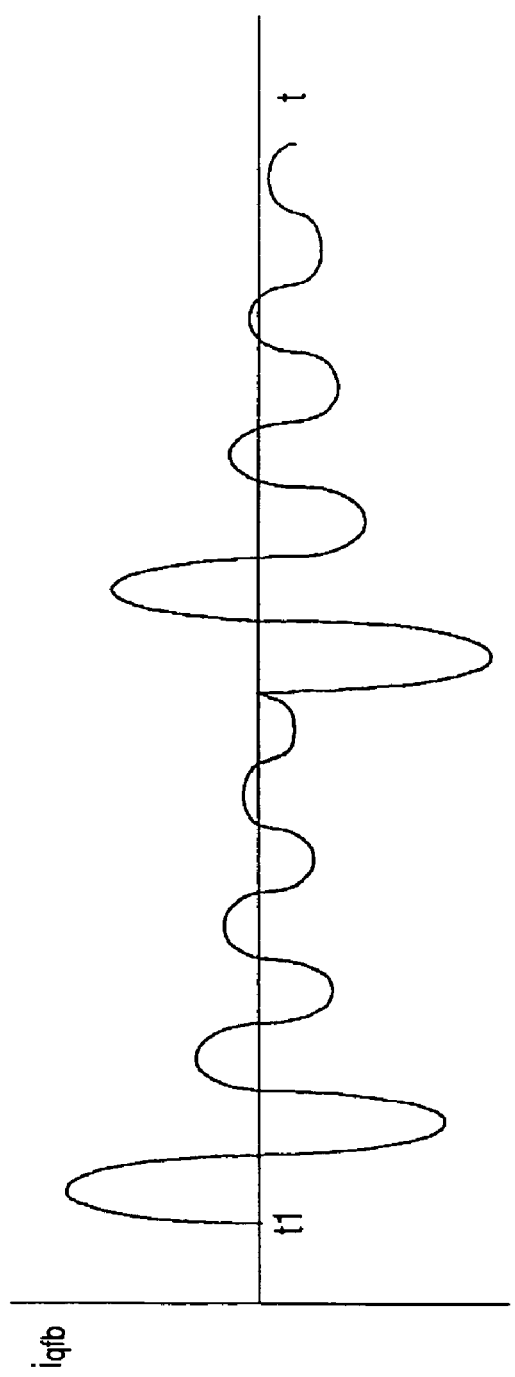
Figure 3A:
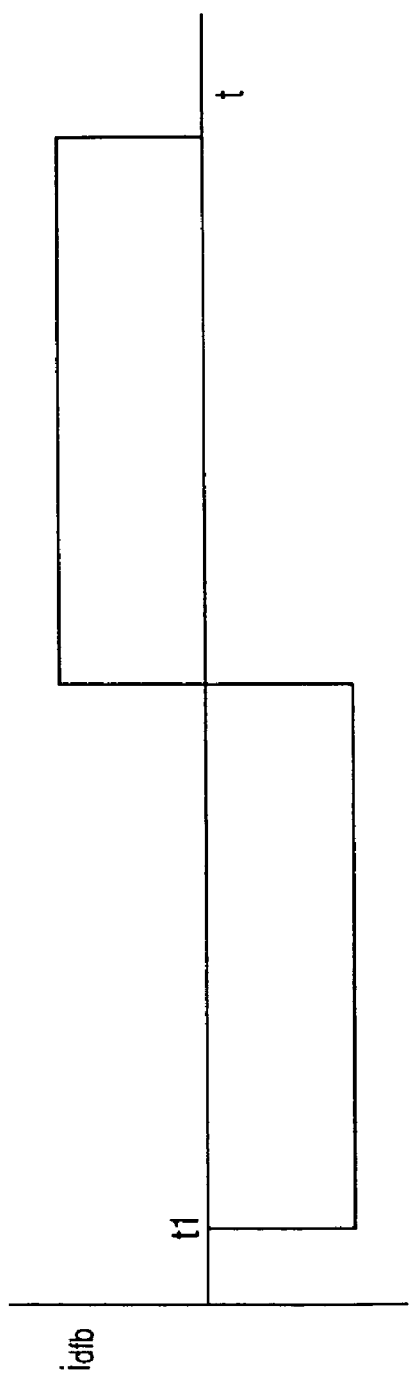
FIGS. 3(*a*) and 3(*b*) are graphs showing a change for the torque current detection value i qfb for a case wherein a direct current is supplied to the alternating-current motor, in the free running state, that is rotated in the reverse direction.
Figure 3B:
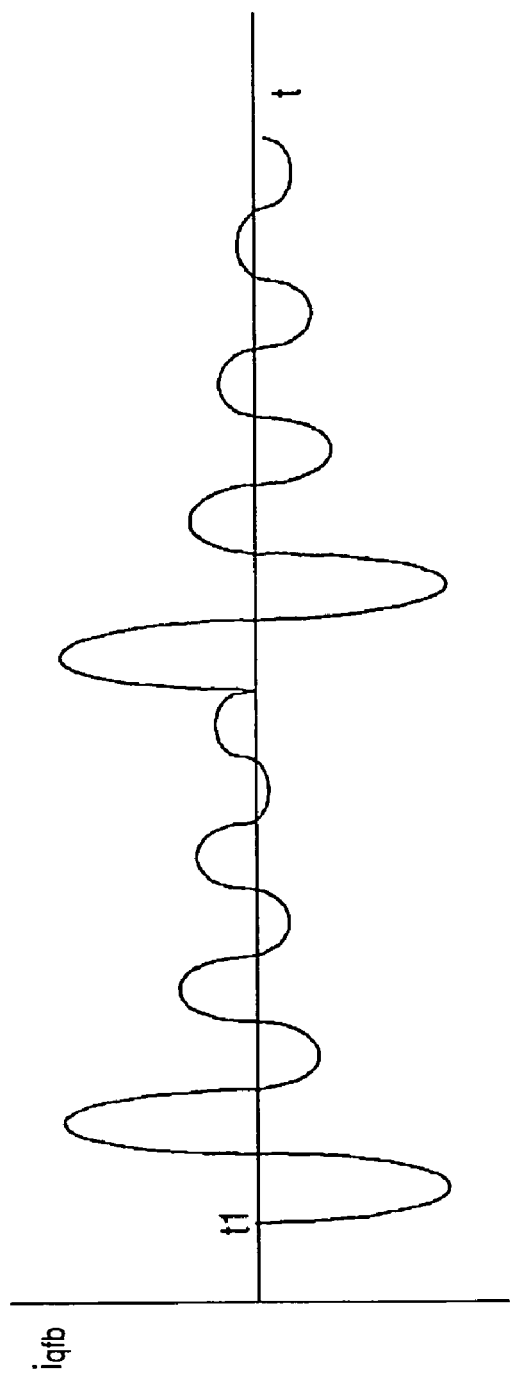

According to this invention, a direct current or a direct-current voltage is applied to the alternating-current motor in the free running state before it is restarted, and a secondary current that is flowing at this time is employed to estimate the rotational direction and the velocity of the alternating-current motor. In FIG. 2 is shown a case wherein the alternating-current motor 2 is rotated forward in the free running state, and in FIG. 3 is shown a case wherein the alternating-current motor 2 is rotated in reverse in the free running state. In FIGS. 2 and 3, (a) represents the exciting current detection value i dfb of the alternating-current motor 2, and (b) represents a time-transient change of the torque current detection value i qfb of the alternating-current motor 2.

In FIG. 2, when at time t1 shown in (a) the exciting current detection value i dfb having a negative rectangular wave is supplied to the alternating-current motor 2 that is rotated forward in the free running state, the torque current detection value i qfb having a waveform that rises in the positive direction is produced, as is shown in (b).

On the other hand, as is shown in FIG. 3, when at time t1 in (a) the exciting current detection value i dfb having a negative rectangular wave is supplied to the alternating-current motor 2 that is rotated in reverse in the free running state, the torque current detection value i qfb having a waveform that falls in the negative direction is produced, also as is shown in (b).

By focusing on this point, the time-transient change of the obtained torque current detection value i qfb can be employed to detect the rotational direction, and when the frequency of the torque current detection value i qfb is measured, the velocity of the alternating-current motor can be estimated.

The thus estimated rotational direction and velocity of the alternating-current motor 2 are set in the frequency adjustment circuit 11, which is then operated. The frequency adjustment circuit 11 adjusts a frequency so that the torque current detection value i qfb reaches zero, and matches the velocity of the alternating-current motor 2 in the free running state with the output frequency of the power converter. Thus, the alternating-current motor 2 can be smoothly started.

Furthermore, according to the present invention, when the estimated velocity value is wrong, or when the rotational direction is erroneously detected, this is automatically ascertained and a direct current is again applied to estimate the rotational direction and the velocity of the alternating-current motor based on the time-transient change in the torque current detection value i qfb. That is, it is assumed, in accordance with the level of the current flowing in the alternating-current motor, that the rotational direction and the frequency designated for the frequency adjustment circuit have deviated from the actual rotational direction and the actual velocity of the alternating-current motor. Specifically, regarded as a necessary condition is that the level of a current flowing in the alternating-current motor be continued, at a level equal to or higher than the level of a designated current, for a designated period of time. When this condition is established, the restarting of the alternating-current motor is halted, a direct current or a direct-current voltage is again applied to the alternating-current motor, and a secondary current that is supplied at this time is employed to estimate again the rotational direction and the velocity of the alternating-current motor. For the re-estimation in this case, the velocity is estimated so that the upper limit estimated value for the velocity is lower by a designated velocity level than the previously estimated value, or is equal to the final output value of the frequency adjustment circuit. Then, the frequency corresponding to the estimated value is designated for the frequency adjustment circuit, and the alternating-current motor is started.

Figure 6:
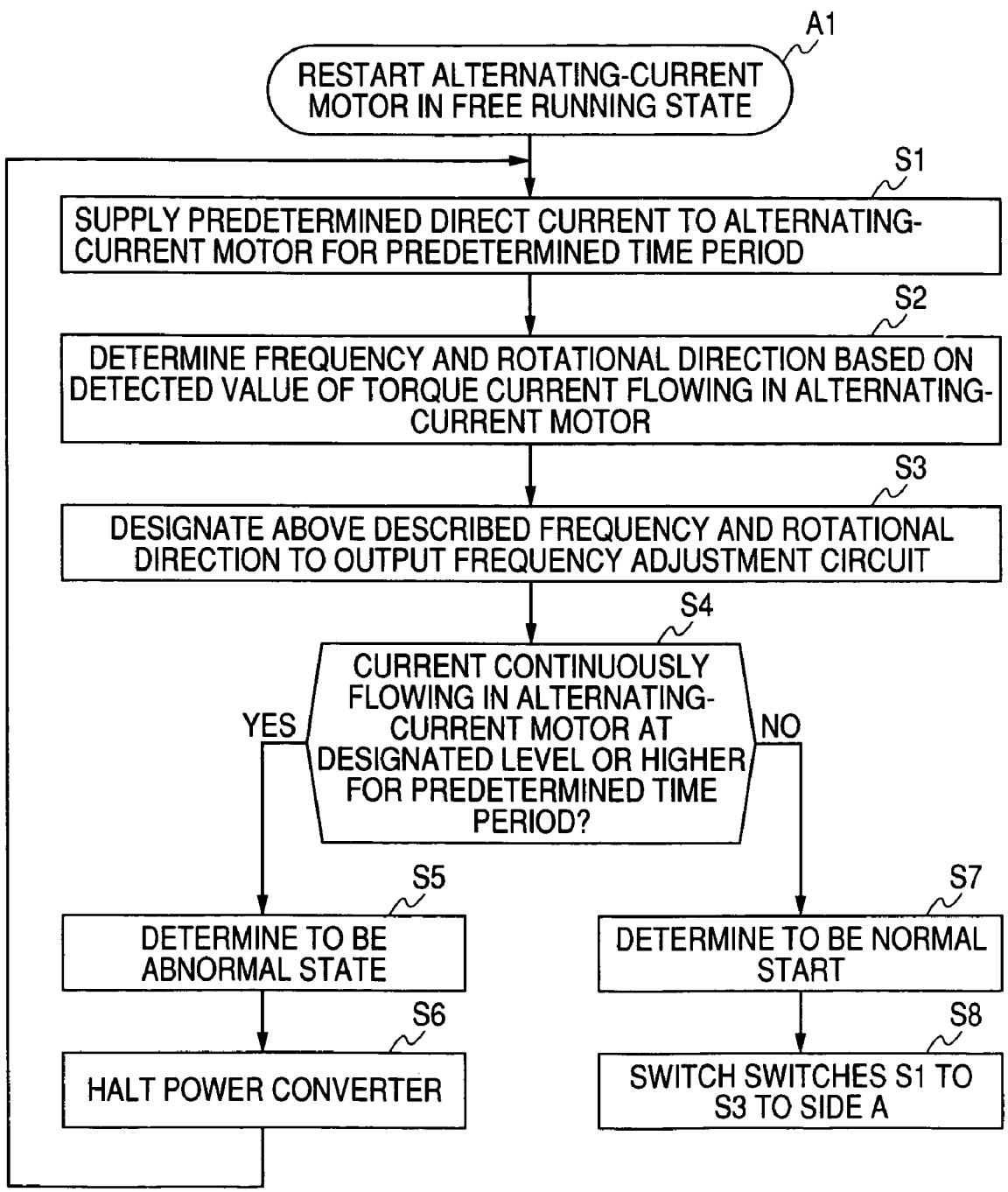
FIG. 6 is a flowchart showing the configuration according to the first embodiment.

Next, while referring to FIGS. 1 and 6, a detailed explanation will be given for the operation of the embodiment for restarting the alternating-current motor in the free running state.

When the alternating-current motor 2 is in the free running state, three switches S1 to S3 in FIG. 1 are changed from the normal running state on a side A to the free running start state on a side B. Therefore, the torque current instruction value i qref=0 is established, an exciting current instruction is output by the V/f conversion circuit 8, and the output frequency f1 is output by the frequency adjustment circuit 11. It should be noted that a zero frequency is set as an initial value for the output frequency adjustment circuit 11. Then, an arbitrary direct current (see (a) in FIG. 2 or 3) is supplied to the alternating-current motor 2 for a designated period of time (step S1). The detection value i qfb (see (b) in FIG. 2 or 3) for a torque current that is flowing at this time is employed to estimate the frequency and the rotational direction (step S2). Based on the estimation results, the frequency and the rotational direction are again designated for the output frequency adjustment circuit 11 (step S3).

After the frequency and the rotational direction are again designated for the output frequency adjustment circuit 11, the V/f conversion circuit 8 operates an exciting current instruction in accordance with a secondary circuit time constant so as to raise a magnetic flux, and the magnetic flux and the designated frequency f1 are employed to calculate and output the voltage Eref that corresponds to an induction voltage for the alternating-current motor.

The frequency adjustment circuit 11 reduces the frequency when the torque current detection value i qfb is positive, or increases the output frequency when the torque current detection value i qfb is negative, so that the torque current detection value i qfb approaches 0.

When the magnetic flux has reached the level for normal operation, and when the torque current detection value i qfb reaches a specific setup level close to 0 (i.e., when the current flowing in the alternating-current motor is no longer continued at a setup level or higher for an arbitrary period of time (NO at step S4)), it is determined that the alternating-current motor can be started normally, and the three switches S1 to S3 are switched to side A (step S7).

On the other hand, when, while the frequency adjustment circuit 11 is adjusting the frequency, the current flowing in the alternating-current motor is continued at an arbitrary setup level or higher for an arbitrary period of time (YES at step S4), it is determined in this embodiment that an abnormal state has apparently occurred (step S5). This state is a case wherein either the rotational direction of the alternating-current motor differs from the rotational direction designated for the frequency adjustment circuit 11, or wherein the velocity of the alternating-current motor deviates greatly from the frequency setup value designated for the frequency adjustment circuit 11.

When this state is detected, the power converter is temporarily halted (step S6), program control returns to step S1, whereat a direct current is again applied, the rotational direction and the velocity of the alternating-current motor are estimated and again designated for the frequency adjustment circuit.

In this case, a value obtained by subtracting an arbitrary level value from the previously estimated frequency, or the last frequency output by the frequency adjustment circuit, is defined as the upper limit for the estimated velocity value of the alternating-current motor. Then, an erroneous detection during re-evaluation can be prevented.

Furthermore, in this embodiment, an explanation is given for the power conversion apparatus that splits the current flowing in the alternating-current motor 2 into a torque current and an exciting current, and provides vector control for controlling these currents independently. However, the present invention can also be provided by a power conversion apparatus that provides constant V/f control by performing exactly the same processing, so long as a current control circuit is additionally provided that applies a current flowing in the alternating-current motor in the free running state into a torque current and an exciting current, and that controls these currents independently.

A modification of the first embodiment will now be described.

The modification of the first embodiment relates to a method for setting an arbitrary period of time during which a direct current instruction is provided for the exciting current instruction value i dref. A greater value, either the lower limit value of the estimated velocity for the alternating-current motor or a secondary circuit time constant, is designated as an arbitrary period for applying a direct current in order to correctly estimate the rotational direction and the velocity of the alternating-current motor.

As one method for measuring the frequency of a torque current detection value, there is a method for measuring a cycle for a peak on the positive side and a peak on the negative side, or a cycle between zero cross points.

However, when a cycle T1 between a peak on the positive side and a peak on the negative side or a cycle T2 between zero cross points, shown in FIG. 4, can not be measured, the frequency can not be detected. Therefore, a direct current must be continuously supplied to enable the detection of the frequency.

Thus, the focus is that so long as the alternating-current motor is in the free running state at a low velocity, the power converter can be smoothly activated, with little shock, even with the zero frequency or the lowest frequency that can be output, and thus, the lower limit value is designated in advance as the estimated velocity value for the alternating-current motor in the free running state. When the estimated velocity is lower than the lower limit value, it is determined that the alternating-current motor is halted, and the estimated velocity value is set as a predesignated value or a zero frequency for the frequency adjustment circuit.

Figure 5A:
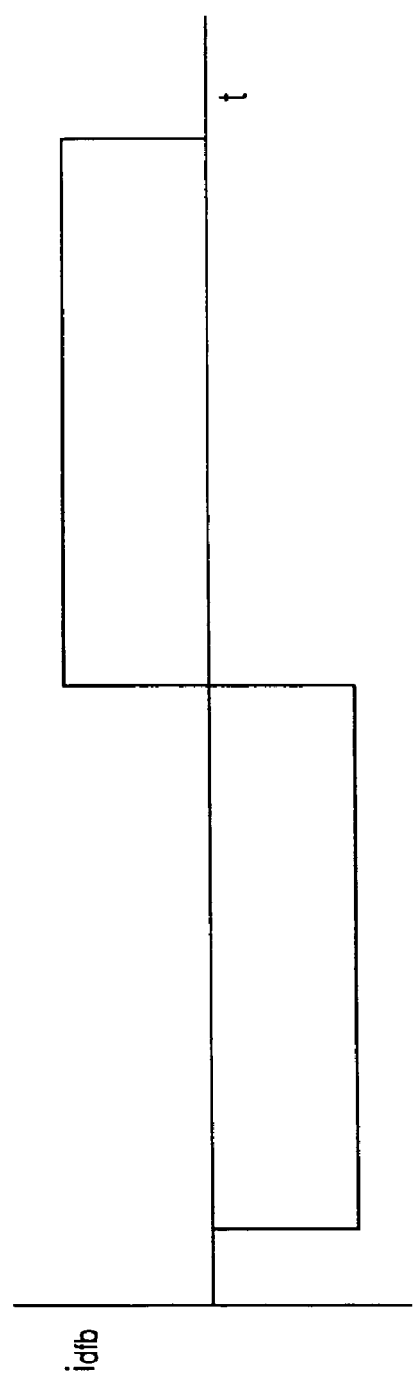
FIGS. 5(*a*) and 5(*b*) are graphs showing a change for the torque current detection value i qfb for a case wherein a direct current is supplied to the alternating-current motor that has a great secondary circuit time constant, as an example.
Figure 5B:
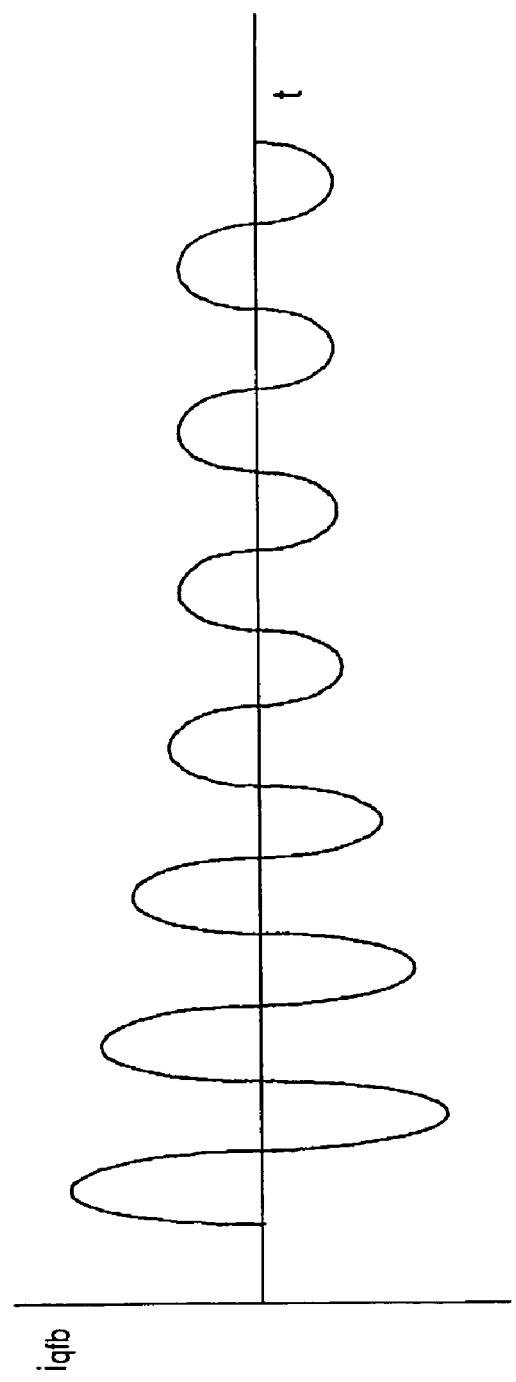

Further, for an alternating-current motor having a large secondary circuit time constant, a case occurs wherein the torque current detection value i qfb has a waveform shown in FIG. 5, due to the affect of a residual voltage, and wherein a rotational direction can not be accurately detected. In order to negate the affect of the residual voltage, a direct current is applied during a period equivalent to, or proportional to, the secondary circuit time constant.

As a result, the residual voltage is canceled by the applied current, the waveform in FIG. 5 is changed to the waveform shown in FIG. 2 (or FIG. 3), which is easily deleted, and the rotational direction can be accurately estimated.

Therefore, as the method for the setup of an arbitrary period wherein a direct current instruction is provided, a longer period is allocated, either a period obtained based on the predesignated lower limit value for the velocity estimated value, or a period equivalent to or proportional to the secondary circuit time constant.

Since the operation for restarting the alternating-current motor in the free running state is described in detail in the first embodiment, no explanation for it will be given here.

An explanation of the present invention is given for a power conversion apparatus that splits a current flowing in the alternating-current motor 2 into a torque current and an exciting current, and that provides vector control for controlling these currents independently. However, the present invention can also be provided by a power conversion apparatus that provides constant V/f control by performing exactly the same processing, so long as a current control circuit is additionally provided that splits a current flowing in the alternating-current motor in the free running state into a torque current and an exciting current and that controls these currents independently.

Moreover, in the present invention, as the frequency measurement method, an explanation is given for the method used to measure a cycle between a peak on the positive side and a peak on the negative side, or a cycle between the zero cross points. However, the velocity of the alternating-current motor can also be estimated by using a common frequency detection method that is established.

Figure 7:
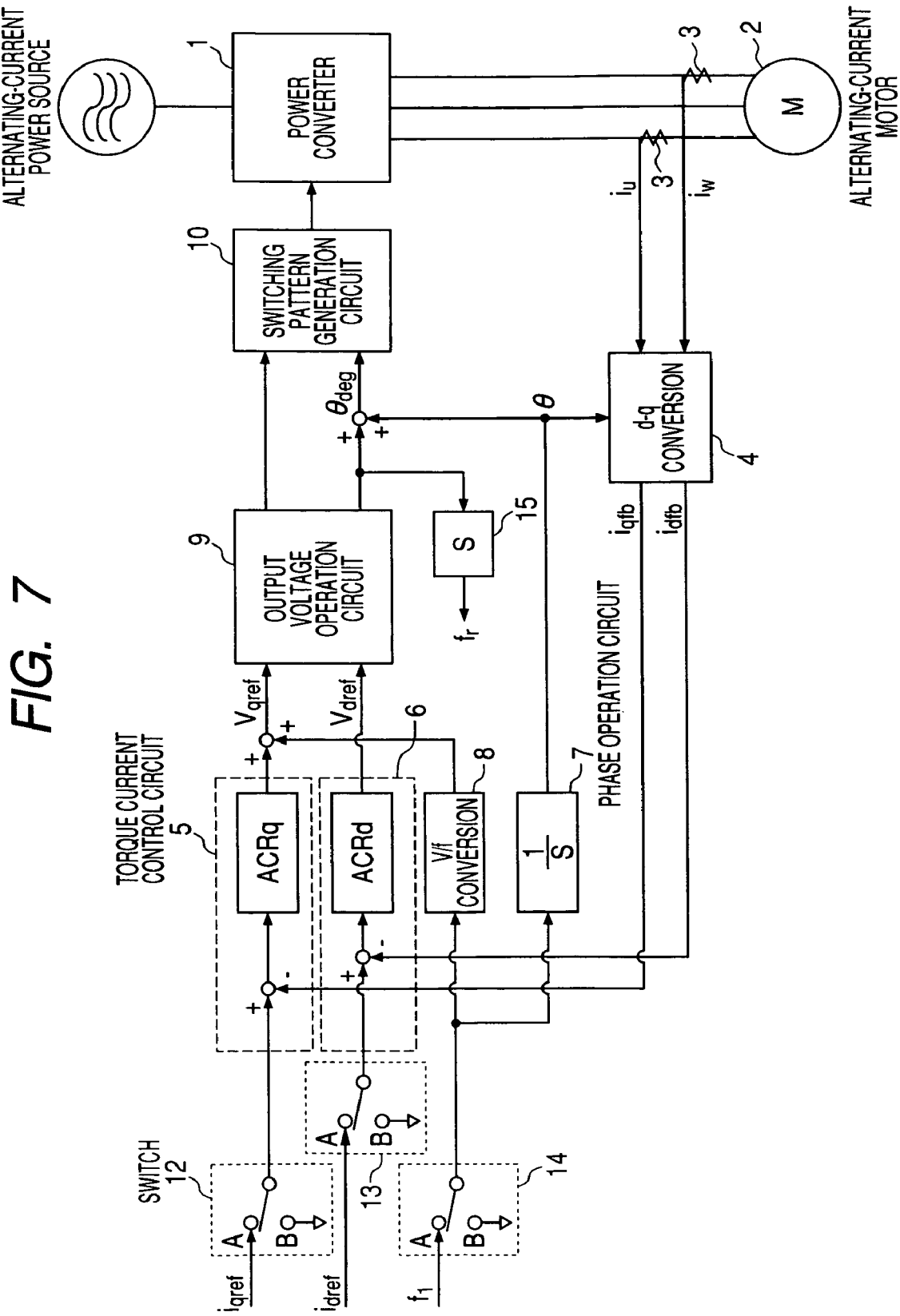
FIG. 7 is a block diagram showing the configuration of a sensorless vector control apparatus for an alternating-current motor according to a second embodiment of the present invention.

FIG. 7 is a block diagram showing the configuration of a sensorless vector control apparatus for an alternating-current motor according to a second embodiment of the present invention. For this embodiment, the sensorless vector control apparatus for an alternating-current motor includes: a power converter 1, an alternating-current motor 2, a current detector 3, a current coordinates conversion circuit 4, a torque current control circuit 5, an exciting current control circuit 6, a phase operation circuit 7, a V/f conversion circuit 8, an output voltage operation circuit 9, a switching pattern generation circuit 10, switches 12, 13 and 14 and a velocity estimation circuit 15.

The power converter 1 performs switching of a main circuit power device, and employs the PWM control system to convert, into an alternating current having an arbitrary frequency and an arbitrary voltage, a direct-current voltage obtained by forward conversion of a three-phase alternating current using a power device, and supplies the alternating current to the alternating-current motor 2. The current detector 3 detects a current supplied to the alternating-current motor 2. The current coordinates conversion circuit 4 splits the current detected by the current detector 3 to obtain a torque current detection value iqfb and an exciting current detection value idfb. The torque current control circuit 5 calculates a first q-axial voltage instruction value V'qref so that a provided torque current instruction value iqref matches the torque current detection value iqfb. The exciting current control circuit 6 calculates a d-axial voltage instruction value dref so that a provided exciting current instruction value idref matches the exciting current detection value idfb.

The phase operation circuit 7 integrates a provided frequency f1 to obtain a phase θ. The V/f conversion circuit 8 employs the provided frequency f1 to calculate a voltage Eref that corresponds to an induction voltage for the alternating-current motor.

The output voltage operation circuit 9 obtains a second q-axial voltage instruction Vqref by adding the first q-axial voltage instruction value V'qref, which is the output of the torque current control circuit 5, to the voltage Eref, which is the output of the V/f conversion circuit 8, and outputs an output voltage instruction value V1ref and its voltage phase θV in accordance with the second q-axial voltage instruction value and the d-axial voltage instruction value. The switching pattern generation circuit 10 determines a switching pattern for the power converter 1 based on the output voltage instruction value V1ref and a power converter output phase θdeg, which is obtained by adding the voltage phase θV and the phase θ.

The velocity estimation circuit 15 is a circuit for estimating a velocity fr for the alternating-current motor 2 in the free running state. The switch 12 is a switch that switches the torque current instruction value iqref to a side B, which is zero, or to a side A, which is for the input to the torque current control circuit 5. The switch 13 is a switch for switching the exciting current instruction value idref to a side B, which is zero, or to a side A, which is for the input to the exciting current control circuit 6. The switch 14 is a switch that switches the frequency f1 to a side B, which is zero, or to a side A, which is for the input to the V/f conversion circuit 8.

A detailed explanation will now be given for the operation for restarting the alternating-current motor in the free running state. When the alternating-current motor 2 is in the free running state, the three switches 12, 13 and 14 in FIG. 7 are switched from the normal running state on the side A to the free-running start state on the side B. Then, the torque current instruction value iqref=0 and the exciting current instruction value idref=0 are established. Further, since a reference phase is not present because the alternating-current motor is in the free running state, a phase that is to be added in accordance with the output frequency during the normal control is fixed at zero, and a current flowing in the alternating-current motor is adjusted to zero. Since an induction voltage is generated in accordance with the rotational velocity of the alternating-current motor in the free running state, and is rotated at the rotational velocity of the alternating-current motor, a current is supplied between the alternating-current motor 2 and the power converter 1 when the power converter 1 is initiated, regardless of the levels of the rotational velocity and the induction voltage of the alternating-current motor 2. Therefore, the current must be adjusted to zero by the torque current control circuit 5 and the exciting current control circuit 6, so that the level of the induction voltage, the phase and the frequency of the alternating-current motor 2 match the level of the output voltage, the phase and the frequency of the power converter. Adjusting the current flowing in the alternating-current motor to zero is called zero-current control.

A first q-axial voltage instruction value V'qref and a d-axial voltage instruction value Vdref, which are the outputs of the torque current control circuit 5 and the exciting current control circuit 6 during zero-current control, are voltage instruction values for which a frequency having a sine wave form is consonant with the rotational velocity of the alternating-current motor 2. The output voltage operation circuit 9 receives the first q-axial voltage instruction value V'qref and the d-axial voltage instruction value, and outputs the output voltage instruction value V1ref and the voltage phase θV. The output voltage instruction value V1ref represents the level of an induction voltage for the alternating-current motor, and the voltage phase θ0 represents the phase of the induction voltage. When the time-transient change in the phase of the induction voltage is measured for each specific period of time, the velocity estimation circuit 15 measures the frequency of the induction voltage. Since, as is apparent from the previous explanation, the frequency for the induction voltage matches the rotational velocity of the alternating-current motor 2, the rotational velocity of the alternating-current motor 2 in the free running state can be estimated. When the alternating-current motor is rotated in reverse, the phase change ratio becomes negative, so that the forward rotation or the reverse rotation of the alternating-current motor in the free running state can also be estimated. As is described above, when the induction voltage of the alternating-current motor is observed through zero-current control, not only the rotational direction but also the rotational velocity of the alternating-current motor can be estimated.

An explanation will now be given for a method whereby an estimated rotational direction and an estimated velocity are set for the power converter when zero-current control is switched to normal control. When the power converter 1 is started by matching only the frequencies in order to shift the zero-current control state to normal operation, an overcurrent may flow to the alternating-current motor and a smooth start may not be obtained. In order to prevent this, the induction voltage at the level during zero-current control and the phase must be continued even at the moment zero-current control is shifted to normal control. Therefore, the initial value must be set for the output voltage instruction value v1ref, the output phase θdeg and the output frequency f1 of the power converter. Specifically, in a normal operation state, the output phase θdeg of the power converter is adjusted by using the phase of the magnetic flux of the alternating-current motor 2 as a reference, while in zero-current control, the output phase is the one consonant with the induction voltage of the alternating-current motor 2. As a result, during zero-current control, the phase for forward rotation is advanced 90° from the phase during normal control, and the phase for the reverse rotation is delayed 90°. Therefore, in accordance with the rotational direction, the phase is corrected by 90° from the last phase in the zero-current control, the estimated value fr, which is output by the velocity estimation circuit 15 as the rotational velocity of the alternating-current motor 2, is converted into a phase, this obtained phase is added to the corrected phase, and the resultant value is set as an initial value for the output phase θdeg of the power converter. Through this processing, continuity of the phase can be maintained.

Further, the output voltage instruction value V1ref, output during zero-current control, is designated as an induction voltage, and continuity of the output voltage is maintained. Through this processing, zero-current control can be smoothly shifted to normal control.

As for an induction motor used as the alternating-current motor, since an induction voltage is attenuated in accordance with the secondary circuit time constant, it is determined, when the induction voltage has reached the normal V/f level based on the secondary circuit time constant, that the alternating-current motor in the free running state can be started normally, and the three switches 12, 13 and 14 are switched to side A.

As for a permanent magnet synchronous motor that is used as the alternating-current motor, since an induction voltage is not attenuated, it is determined, when the process is completed for obtaining continuity for the phase and the output voltage, that the alternating-current motor in the free running state can be normally started, and the three switches 12, 13 and 14 are switched to side A.

An explanation will now be given for a method for determining a wait time until the power converter is restarted. In order to estimate the velocity of the alternating-current motor in the free running state, the first q-axial voltage instruction value V'qref and the d-axial voltage instruction value Vdref, which are the outputs of the torque current control circuit 5 and the exciting current control circuit 6, must match the induction voltage of the alternating-current motor. This will not be a problem so long as the torque current control circuit 5 and the exciting current control circuit 6 demonstrate satisfactory functions for reducing the current flowing in the alternating-current motor to zero.

However, when the gains in the torque current control circuit 5 and the exciting current control circuit 6 are low, or when the alternating-current motor is rotated at a high velocity, a high induction voltage occurs, and an excessive amount of current flows immediately after the power converter is started, so that the power converter may be tripped and may not be smoothly started. To prevent this, the response capabilities of the torque current control circuit 5 and the exciting current control circuit 6 need only be obtained in advance, and the voltage level generated by the alternating-current motor in the free running state need only be set equal to or lower than an arbitrary value, so that zero-current control can be performed, and estimation of the velocity is enabled. That is, the induction voltage of the alternating-current motor need only be set equal to or lower than a arbitrarily designated voltage level.

Figure 8:
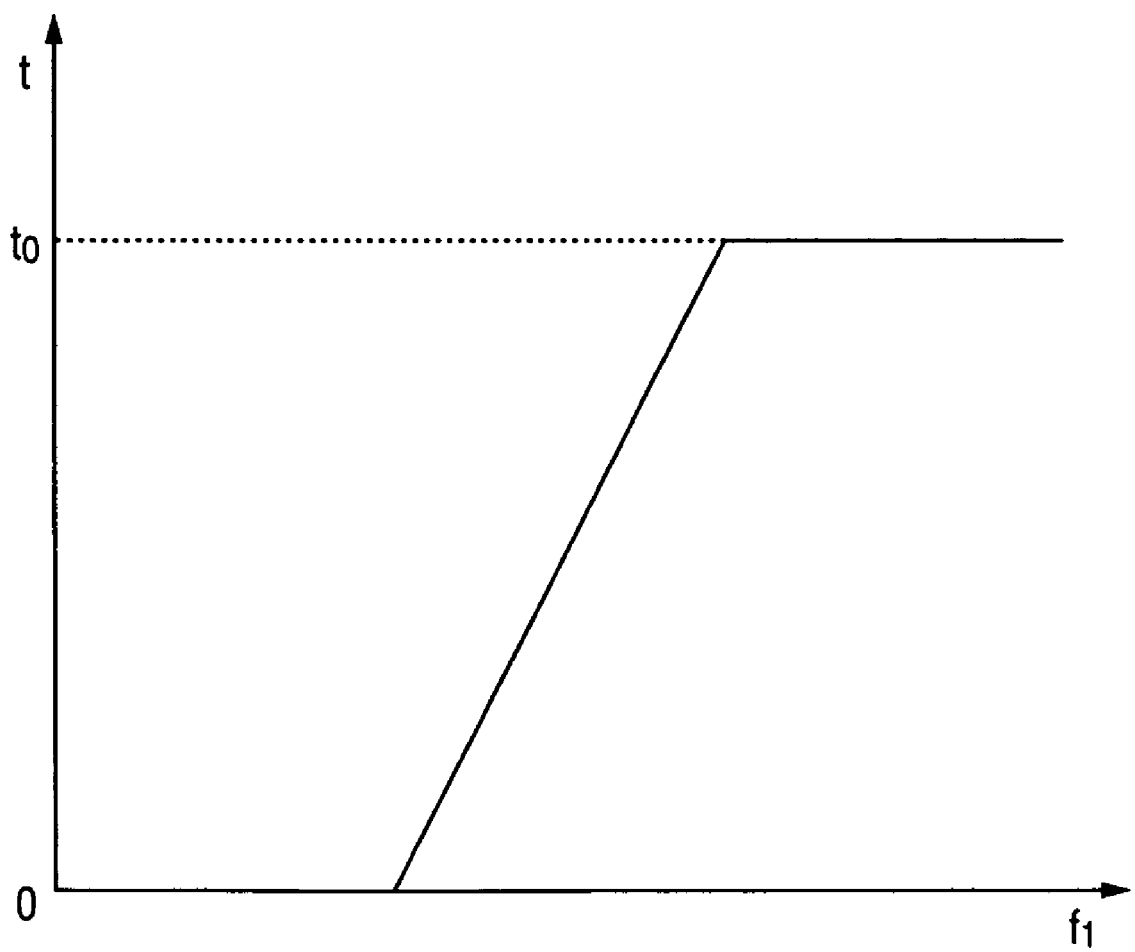
FIG. 8 shows an operation frequency before a free running state and a wait time until a restart occurs.

This can be provided, as one method, by controlling the period of time before the power converter is restarted. Since the induction voltage of the alternating-current motor is determined based on a running time frequency before the free running state, the wait time is not required when the operation is performed with a frequency at which the induction voltage is reduced until equal to or lower than the arbitrarily designated voltage level. When the operation is performed at this frequency or higher, the wait time is required, and can be obtained in accordance with the running time frequency before the free running state and the secondary circuit time constant of the alternating-current motor. When the maximum wait time required is calculated and obtained in accordance with the secondary circuit time constant of the alternating-current motor, an appropriate wait time can be determined, as is shown in FIG. 8, in accordance with the running-time frequency before the alternating-current motor enters the free running state.

An explanation will now be given for a method according to another invention for coping with a case wherein, since the induction voltage of the alternating-current motor is large, it is difficult for the current in the alternating-current motor to be adjusted to zero. When the alternating-current motor is an induction motor having a large secondary circuit time constant or a permanent magnet synchronous motor, there is a possibility that the induction voltage will not be reduced until equal to or lower than an arbitrarily designated voltage level, even when the above described wait time has elapsed. In this case, zero-current control is temporarily halted, switching is performed for the power converter, so that the three phases of the alternating-current motor are short-circuited, and the three-phase short circuit is continued for an arbitrarily designated period of time. Then, a damping force is generated in the alternating-current motor, which thereafter decelerates.

Therefore, the induction voltage of the alternating-current motor is reduced. After an arbitrary period of time has elapsed, zero-current control is again initiated, and when the induction voltage is dropped until equal to or lower than the arbitrarily designated voltage level, the velocity can be estimated through zero-current control. However, when the induction voltage is not equal to or lower than the arbitrarily designated voltage level, the switching is again performed to maintain the three-phase short circuit during the arbitrary period of time. As is described above, it is characterized in that this process is repeated until the induction voltage of the alternating-current motor is reduced to the arbitrarily designated voltage level, so that the flow of an excessive amount of current and the tripping of the power converter can be prevented, and the alternating-current motor can be smoothly restarted.

Furthermore, in this embodiment, an explanation will be given for the power conversion apparatus that splits a current flowing in the alternating-current motor 2 into a torque current and an exciting current, and that provides vector control for controlling these currents independently. However, the present invention can also be provided by a power conversion apparatus that performs the constant V/f control by performing exactly the same processing, so long as a current control circuit is additionally provided that splits a current flowing in the alternating-current motor in the free running state into a torque current and an exciting current, and that controls these currents independently.

Figure 9:
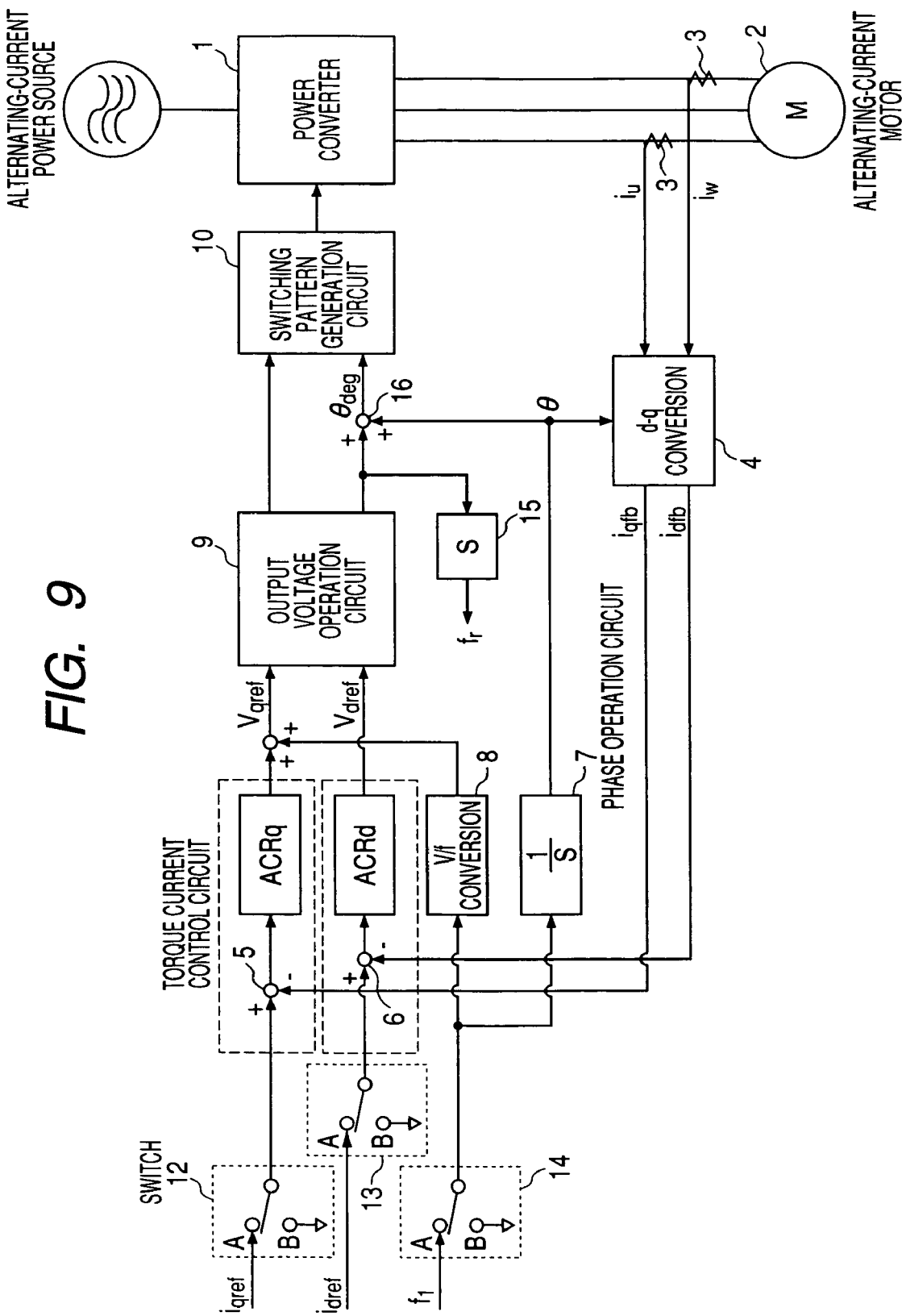
FIG. 9 is a block diagram showing the configuration of a sensorless vector control apparatus for an alternating-current motor according to a third embodiment of the present invention.

FIG. 9 is a block diagram showing the configuration of a sensorless vector control apparatus for an alternating-current motor according to a third embodiment of the present invention.

For this embodiment, the sensorless vector control apparatus for an alternating-current motor includes: a power converter 1, an alternating-current motor 2, a current detector 3, a current coordinates conversion circuit 4, a torque current control circuit 5, an exciting current control circuit 6, a phase operation circuit 7, a V/f conversion circuit 8, an output voltage operation circuit 9, a switching pattern generation circuit 10, a velocity estimation circuit 15 and an adder 16. The power converter 1 employs the PWM control system to convert, into an alternating current having an arbitrary frequency and an arbitrary voltage, a direct-current voltage obtained by converting a three-phase alternating current using a power device, and supplies the alternating current to the alternating-current motor 2.

The current detector 3 detects a current supplied to the alternating-current motor 2, and supplies a current detection signal to the current coordinates conversion circuit 4.

The current coordinates conversion circuit 4 splits the current detected by the current detector 3 to obtain a torque current detection value iqfb and an exciting current detection value idfb, transmits the obtained torque current detection value iqfb to the torque current control circuit 5, and transmits the obtained exciting current detection value idfb to the exciting current control circuit 6. The torque current control circuit 5 calculates a first q-axial voltage instruction value V'qref so that a provided torque current instruction value iqref matches the torque current detection value iqfb.

The exciting current control circuit 6 calculates ad-axial voltage instruction value dref so that a provided exciting current instruction value idref matches the exciting current detection value idfb.

The phase operation circuit 7 integrates a provided frequency f1 to obtain a phase θ, and transmits the phase θ to the current coordinates conversion circuit 4 and the adder 16.

The V/f conversion circuit 8 employs the provided frequency f1 to calculate a voltage Eref that corresponds to an induction voltage for the alternating-current motor. This voltage Eref is set in advance so as to establish Eref/f1=constant value.

The output voltage operation circuit 9 obtains a second q-axial voltage instruction Vqref by adding the first q-axial voltage instruction value V'qref, which is the output of the torque current control circuit 5, to the voltage Eref, which is the output of the V/f conversion circuit 8, and outputs an output voltage instruction value V1ref and its voltage phase θV in accordance with the second q-axial voltage instruction value Vqref and the d-axial voltage instruction value dref.

$$V1ref=[(Vdref)2+(Vqref)2]1/2 \quad (1)$$

$$θV=\tan-1(Vqref/Vdref) \quad (2)$$

The switching pattern generation circuit 10 determines a switching pattern for the power converter 1 based on the output voltage instruction value V1ref and a power converter output phase θdeg, which is obtained by adding the voltage phase θV and the phase θ.

The velocity estimation circuit 15 is a circuit that employs changes in the voltage phase θV, by the unit hour, to estimate the velocity fr and the rotational direction of the alternating-current motor 2 in the free running state.

A detailed explanation will now be given for the operation for restarting the alternating-current motor in the free running state. When the alternating-current motor 2 is in the free running state, the three switches 12, 13 and 14 in FIG. 9 are switched from the normal running state on the side A to the free-running start state on the side B. Then, the torque current instruction value iqref=0 and the exciting current instruction value idref=0 are established. Further, since a reference phase is not present because the alternating-current motor is in the free running state, a phase that is to be added in accordance with the output frequency during the normal control is fixed at zero, and a current flowing in the alternating-current motor is adjusted to zero. Since an induction voltage is generated in accordance with the rotational velocity of the alternating-current motor 2 in the free running state, and is rotated at the rotational velocity of the alternating-current motor, a current is supplied between the alternating-current motor 2 and the power converter 1 when the power converter 1 is initiated, regardless of the levels of the rotational velocity and the induction voltage of the alternating-current motor 2. Therefore, the current must be adjusted to zero by the torque current control circuit 5 and the exciting current control circuit 6, so that the level of the induction voltage, the phase and the frequency of the alternating-current motor 2 match the level of the output voltage, the phase and the frequency of the power converter. Adjusting the current flowing in the alternating-current motor to zero is called zero-current control.

A first q-axial voltage instruction value V'qref and a d-axial voltage instruction value Vdref, which are the outputs of the torque current control circuit 5 and the exciting current control circuit 6 during zero-current control, are voltage instruction values for which a frequency having a sine wave form is consonant with the rotational velocity of the alternating-current motor 2. The output voltage operation circuit 9 receives the first q-axial voltage instruction value V'qref and the d-axial voltage instruction value Vdref, and outputs the output voltage instruction value V1ref and the voltage phase θV. The output voltage instruction value V1ref represents the level of an induction voltage for the alternating-current motor, and the voltage phase θ0 represents the phase of the induction voltage. When the time-transient change in the phase of the induction voltage is measured for each specific period of time, the velocity estimation circuit 15 measures the frequency of the induction voltage. Since, as is apparent from the previous explanation, the frequency for the induction voltage matches the rotational velocity of the alternating-current motor 2, the rotational velocity in the free running state can be estimated. When the alternating-current motor is rotated in reverse, the phase change ratio becomes negative, so that the forward rotation or the reverse rotation of the alternating-current motor in the free running state can also be estimated. As is described above, when the induction voltage of the alternating-current motor is observed through zero-current control, not only the rotational direction but also the rotational velocity of the alternating-current motor can be estimated.

An explanation will now be given for a method whereby an estimated rotational direction and an estimated velocity are set for the power converter when zero-current control is switched to normal control.

When the power converter 1 is started by matching only the frequencies in order to shift the zero-current control state to normal operation, an overcurrent may flow to the alternating-current motor and a smooth start may not be obtained. In order to prevent this, the induction voltage at the level during zero-current control and the phase must be continued even at the moment zero-current control is shifted to normal control. Therefore, the initial value must be set for the output voltage instruction value v1ref, the output phase θdeg and the output frequency f1 of the power converter. Specifically, in a normal operation state, the output phase θdeg of the power converter is adjusted by using the phase of the magnetic flux of the alternating-current motor 2 as a reference, while in zero-current control, the output phase is the one consonant with the induction voltage of the alternating-current motor 2. As a result, during zero-current control, the phase for forward rotation is advanced 90° from the phase during normal control, and the phase for the reverse rotation is delayed 90°. Therefore, in accordance with the rotational direction, the phase is corrected by 90° from the last phase in the zero-current control, the estimated value fr, which is output by the velocity estimation circuit 15 as the rotational velocity of the alternating-current motor 2, is converted into a phase, this obtained phase is added to the corrected phase, and the resultant value is set as an initial value for the output phase θdeg of the power converter. Through this processing, continuity of the phase can be maintained.

Further, the output voltage instruction value V1ref, output during zero-current control, is designated as an induction voltage, and continuity of the output voltage is maintained. Through this processing, zero-current control can be smoothly shifted to normal control.

The induction voltage of the alternating-current motor is gradually increased in accordance with the secondary circuit time constant, and when the induction voltage matches the normal V/f level, it is determined that the alternating-current motor in the free running state can be normally started, and the three switches are switched to the side A.

An explanation will now be given for a method according to the present invention for improving current response during zero-current control. In order to estimate the velocity of the alternating-current motor in the free running state, the first q-axial voltage instruction value V'qref and the d-axial voltage instruction value Vdref, which are the outputs of the torque current control circuit 5 and the exciting current control circuit 6 during zero-current control, must match the induction voltage of the alternating-current motor.

This will not be a problem so long as the torque current control circuit 5 and the exciting current control circuit 6 demonstrate satisfactory functions for adjusting the current flowing in the alternating-current motor to zero. However, when the gains of the torque current control circuit 5 and the exciting current control circuit 6 can not be increased, or when the alternating-current motor is rotated at a high velocity, a high induction voltage is generated and an excessive amount of current flows immediately after the power converter is initiated, so that the power converter may be tripped and may not be smoothly started. To prevent this, the responses of the torque current control circuit 5 and the exciting current control circuit 6 must be improved. Since responses are delayed when the scanning period for performing current control is short, the current can be controlled as instructed. So long as the other operations are omitted during zero-current control, the scanning period for current control can be reduced, compared with normal control, and the current control response can be improved. Further, when the preparation of the switching pattern for the power converter is delayed, even though the scanning period for current control is reduced during zero-current control, the effects obtained by the reduction of the scanning period for current control are reduced by half. Therefore, when zero-current control is to be used, only a carrier frequency used as a reference need be increased for the power converter to be operated at a high velocity. In this manner, the current control response can be improved.

As is described above, it is characterized in that the current control scanning period during zero-current control is reduced compared with normal control, or the carrier frequency for the power converter is increased, so that the current control response is improved, the flow of an excessive amount of current during zero-current control and the tripping of the power converter can be prevented, and the alternating-current motor can be smoothly restarted.

An explanation will now be given by referring to FIG. 10, which is a block diagram showing the configuration of a sensorless vector control apparatus for an alternating-current motor according to a modification for a fourth embodiment of the present invention.

The sensorless vector control apparatus for a motor according to this embodiment includes: a power converter 1, an alternating-current motor 2, a current detector 3, a current coordinates conversion circuit 4, a torque current control circuit 5, an exciting current control circuit 6, a phase operation circuit 7, a V/f conversion circuit 8, an output voltage operation circuit 9, a switching pattern generation circuit 10 and a velocity estimation circuit 15B. Since the components other than the velocity estimation circuit 15B are employed in common, no explanation for them will be given.

The velocity estimation circuit 15B is a circuit used to estimate the velocity and the rotational direction of the alternating-current motor 2, in the free running state, in accordance with a torque current detection value iqfb and an exciting current detection value idfb obtained upon the application of a direct current.

A detailed explanation will now be given for the operation for restarting the alternating-current motor in the free running state. In the third embodiment, when an output voltage instruction value V1ref, which is output by the output voltage operation circuit 9 during zero-current control, is lower than an arbitrarily designated level, it can not be determined whether this has occurred because the alternating-current motor in the free running state is substantially halted, or whether a residual voltage has dissipated due to a small secondary circuit time constant. Therefore, when this state occurs, the operation in the third embodiment is halted, and a switch is made to the operation in the fourth embodiment.

Figure 10:
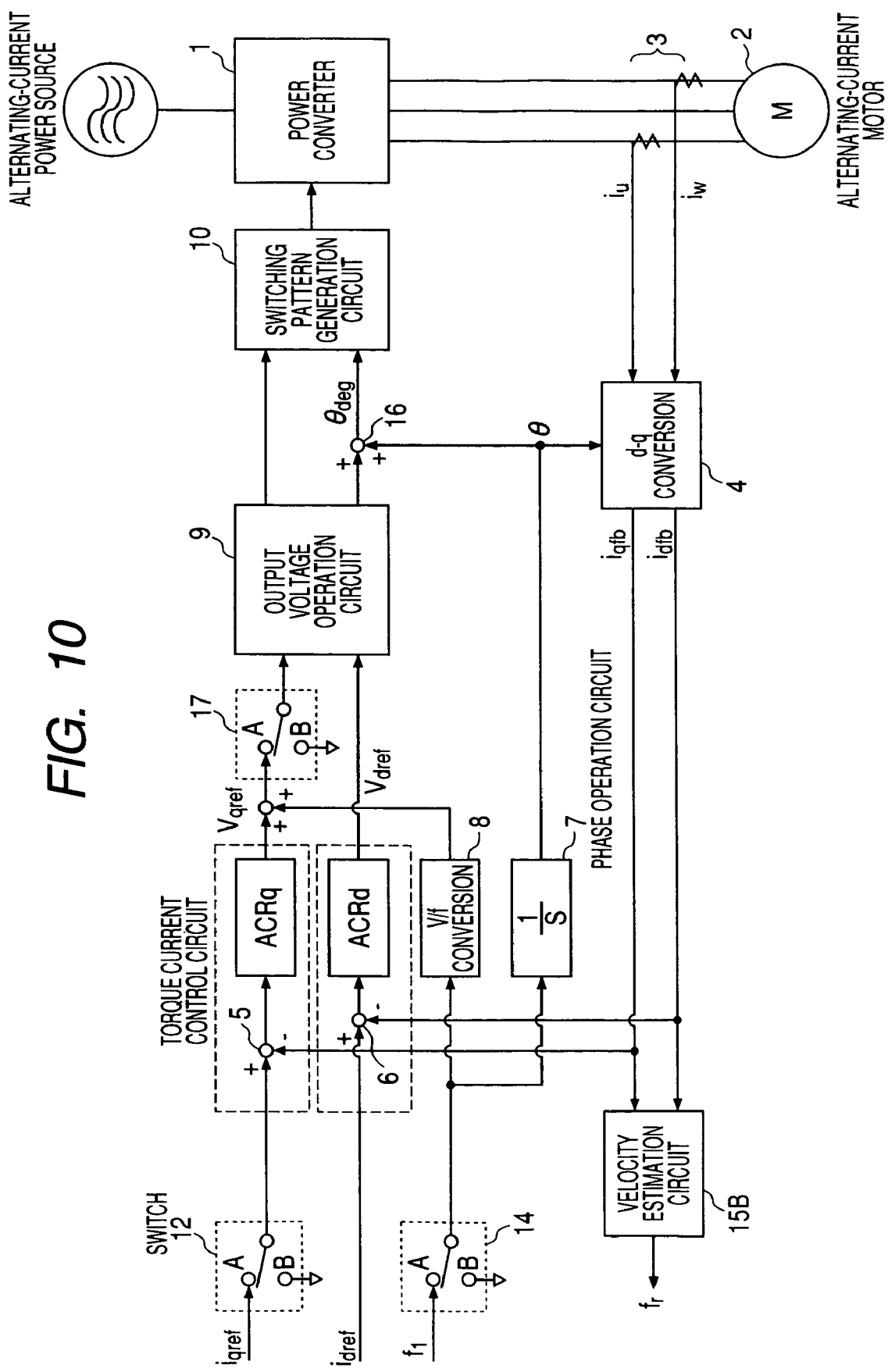
FIG. 10 is a block diagram showing the configuration of a sensorless vector control apparatus for an alternating-current motor according to a fourth embodiment of the present invention.

Three switches (12, 14 and 17) in FIG. 10 are switched from the normal operation state on side A to the free-running start state on side B, and thus, a torque current instruction iqref=0 is established. Further, since no phase is used as a reference while the alternating-current motor is in the free running state, a phase to be added in accordance with the output frequency during the normal control is fixed at zero, and a current flowing in the alternating-current motor is controlled. In addition, a second q-axial voltage instruction value Vqref is set to zero in order to employ the torque current detection value iqfb, for the alternating-current motor in the free running state, for estimating the velocity and the rotational direction.

A specific setup value is provided as an exciting current instruction value idref in order to excite the alternating-current motor, and the exciting current control circuit 6 provides the control for a designated period of time, so that an exciting current detection value idfb is equal to the exciting current instruction value idref. Thereafter, the sign and the level of the exciting current instruction value idref are changed, and control is provided for a designated period of time.

At this time, by applying a direct current, a magnetic flux is generated in the alternating-current motor in the free running state, so that a secondary current that temporarily flows across the rotor of the alternating-current motor is detected, based on the torque current detection value iqfb. The frequency of the torque current detection value iqfb and the phase information obtained upon the application of the direct current are detected, and the velocity and the rotational direction of the alternating-current motor are estimated.

When the alternating-current motor 2 is rotated forward, the torque current detection value iqfb is changed as is shown in FIG. 2. When the sign of the exciting current detection value idfb is negative, the phase of the torque current detection value iqfb is changed to a sine wave beginning at 0°. When the sign of the exciting current detection value idfb is positive, the phase of the torque current detection value iqfb is changed to a sine wave beginning at 180°. Since the frequency of the sine wave of the torque current detection value iqfb matches the velocity of the alternating-current motor 2 in the free running state, the velocity of the alternating-current motor 2 can be obtained by measuring the frequency of the torque current detection value iqfb. Furthermore, when the alternating-current motor is rotated in reverse, the torque current detection value iqfb is changed as is shown in FIG. 3. When the sign of the exciting current detection value idgb is negative, the phase of the torque current detection value iqfb is changed to a sine wave beginning at 180°. When the sign of the exciting current detection value idfb is positive, the phase of the toque current detection value iqfb is changed to a sine wave beginning at 0°.

As is described above, when a direct current is applied to the alternating-current motor, the phase relationship between the exciting current detection value idfb and the torque current detection value iqfb, and the frequency of the torque current detection value iqfb are detected, so that the velocity and the rotational direction can be estimated.

An explanation will now be given for a method for designating, for the power converter, a rotational direction and a velocity that are estimated when the direct current application state is shifted to normal control after an arbitrary time has elapsed. In this case, unlike the third embodiment, a magnetic flux must be newly generated because almost no induction voltage remains in the alternating-current motor, and the power converter 1 need only be started by matching the rotational direction and the frequency. The induction voltage of the alternating-current motor is gradually increased in accordance with the secondary circuit time constant, and when the induction voltage reaches the normal V/f level, it is determined that the alternating-current motor in the free running state can be normally started, and the three switches are switched to side A.

An explanation will now be given for a method according to the invention for increasing the accuracy whereby a velocity is estimated by detecting the frequency of the torque current detection value iqfb during the application of a direct current.

When the alternating-current motor is in the free running state at a high velocity, the frequency of the torque current detection value igfb in FIG. 2 or 3 is increased. As one method for measuring the frequency of the torque current detection value iqfb, there is a method for measuring the cycle between a peak on the positive side and a peak on the negative side, or the cycle between zero cross points. When the scanning for current control is slow to measure the cycle between a peak on the positive side and a peak on the negative side, or the cycle between zero cross points, the accuracy of the measurement of the cycle is low, and the accuracy of the detection of the frequency is also low. Further, when the alternating-current motor is in the free running state at a high velocity, a difference between a direct current and the frequency of the alternating-current motor is increased, and because of this frequency difference, the impedance is increased while a current flowing in the rotor is reduced. Accordingly, the torque current detection value iqfb is reduced, and it is difficult to measure the cycle between the peak on the positive side and the peak on the negative side of the torque current detection value iqfb, or the cycle between zero cross points.

So long as other operations are omitted during the application of the direct current, the scanning period for current control can be reduced, compared with during normal control, and the frequency detection accuracy can be increased. Furthermore, when the current control scanning period is reduced during the application of the direct current and the carrier frequency of the power converter is increased, the current control response can be improved, and the exciting current detection value idfb can be adjusted to provide a rectangular waveform. Therefore, the secondary current of the alternating-current motor is completely reflected onto the torque current detection value iqfb. In addition, when the velocity of the alternating-current motor in the free running state is increased, the torque current detection value igfb is reduced, and detection is difficult using a common current detection method. Therefore, during the application of the direct current, the detection sensitivity of the current detection circuit need only be increased several times to detect even a small current, so that, in the free running state at a high velocity, the cycle between the peak on the positive side and the peak on the negative side, or the cycle between the zero cross points, can be measured.

It is, therefore, characterized in that: the current control response can be improved by reducing the current control scanning period during the application of a direct current, and by increasing the carrier frequency of the power converter; the velocity of the alternating-current motor in the free running state can be accurately measured since the resolution is increased for the measurement of the cycle between the positive-side peak and the negative-side peak of the torque current detection value iqfb, or the cycle between zero cross points; and since during the application of a direct current the detection sensitivity of the current detection circuit is increased more than when under normal control, the velocity can be detected in the free running state under a restriction, so that the alternating-current motor can be smoothly restarted.

Moreover, according to this embodiment, an explanation is given for a power conversion apparatus that splits a current flowing in the alternating-current motor 2 into a torque current and an exciting current, and provides vector control for controlling these currents independently. However, the present invention can also be provided by a power conversion apparatus that performs the constant V/f control by performing exactly the same processing, so long as a current control circuit is additionally provided that splits a current flowing in the alternating-current motor in the free running state into a torque current and an exciting current and that controls these currents independently.

The present invention is described in detail by referring to specific embodiments. However, it will be obvious for one having ordinary skill in the art that the present invention can be variously modified or altered without departing from the spirit and the scope of the invention.

The present application is based on Japanese Patent Application (No. 2002-198712) filed on Jul. 8, 2002, Japanese Patent Application (No. 2002-315177) filed on Oct. 30, 2002 and Japanese Patent Application (No. 2003-121733) filed on Apr. 25, 2003, and the contents of these applications are employed here as references.

INDUSTRIAL APPLICABILITY

As is described above, according to the first embodiment of the present invention, when the alternating-current motor is restarted and the current continuously flows in the alternating-current motor at a designated current level or higher for a designated period of time, it is determined that the rotational direction or the velocity of the alternating-current motor is incorrectly estimated, and a direct current or a direct-current voltage is again applied to estimate the rotational direction and the velocity. Therefore, the alternating-current motor in the free running state can be smoothly restarted.

According to the modification of the first embodiment of the present invention, since a greater value, either the lower limit value of the estimated velocity of the alternating-current motor or the secondary circuit time constant, is designated as an arbitrary period for the application of a direct current, the optimal direct current application time is employed to appropriately estimate the rotational direction and the velocity of the alternating-current motor. Therefore, the alternating-current motor in the free running state can also be smoothly restarted.

According to the second embodiment of the invention, a sensorless vector control method for an alternating-current motor, whereby there are provided a power converter, for outputting power to an alternating-current motor, and a current controller, for controlling an output current of the power converter based on a signal indicating a deviation between a current instruction signal and a detection signal for an output current of the power converter, and a velocity detector and a voltage detector are not provided, whereby current control is performed by forcibly setting the current instruction signal to zero so as to reduce to zero a current in the alternating-current motor in a free running state, whereby a level and a phase of a remaining voltage in the alternating-current motor and an angular velocity are calculated based on an output voltage instruction signal obtained by employing a current output by the current controller, and a rotational direction and a velocity of the alternating-current motor in the free running state are estimated, and whereby, in accordance with a running frequency of the power converter before the free running state, and a secondary circuit time constant of the alternating-current motor, determining a wait time until the current control is started with the current instruction signal set to zero. Therefore, a control method and a control apparatus for an alternating-current motor can be provided whereby, when the response from the current controller is poor, or when not only an induction motor but also a permanent magnet synchronous motor is employed as the alternating-current motor, the operation of the alternating-current motor can be appropriately and smoothly continued.

According to the third embodiment of the invention, when the current control is performed by forcibly setting the current instruction signal to zero in order to reduce the current at the alternating-current motor to zero, the response from the current controller is increased, the overcurrent state of the power converter is avoided, and the operation can be smoothly continued.

According to the fourth embodiment of the invention, when the velocity and the rotational direction of the alternating-current motor in the free running state at a high velocity are estimated by providing a direct current instruction, the accuracy of the detection of the frequency is increased. Thus, effects can be obtained such that the operation can be smoothly continued when the alternating-current motor is in the free running state at a high velocity.

The invention claimed is:

1. A sensorless vector control method for an alternating-current motor, the sensorless vector control method employing:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting thereof, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a velocity detector and a voltage detector are not provided, a phase angle, output by the phase angle operation circuit, is added to the level and the phase output by the output voltage operation circuit in order to regulate the switching of the power converter, the sensorless vector control method comprising the steps of:

applying a direct current or a direct-current voltage to the alternating-current motor in a free running state before the alternating-current motor is started, estimating a rotational direction and a velocity for the alternating-current motor based on a secondary current that flows at the application time, setting a frequency that corresponds to the rotational direction and the velocity for a frequency adjustment circuit to activate the alternating-current motor, matching the frequency adjustment circuit an output frequency with the velocity of the alternating-current motor, and estimating, based on the level of a current flowing in the alternating-current motor, that the rotational direction and the frequency designated for the frequency adjustment circuit deviate from the actual rotational direction and the actual velocity of the alternating-current motor.

2. The sensorless vector control method for an alternating-current motor, according to claim 1, wherein a case that the level of the current flowing in the alternating-current motor is continued for a designated period of time, at an equal to or higher than designated current level, is established as a reference that is used to estimate that the rotational direction and the frequency designated for the frequency adjustment circuit deviate from the actual rotational direction and the actual velocity of the alternating-current motor.

3. The sensorless vector control method for an alternating-current motor, according to claim 1, wherein after it is estimated that the rotational direction and the frequency designated to the frequency adjustment circuit deviate from the actual rotational direction and the actual velocity of the alternating-current motor, a restarting of the alternating-current motor is halted, a direct current or a direct-current voltage is applied to the alternating-current motor, a secondary current, flowing at the application time, is employed to reevaluate the rotational direction and the velocity of the alternating-current motor, a frequency that corresponds to the rotational direction and the velocity is again set to the frequency adjustment circuit, and the alternating-current motor is restarted.

4. The sensorless vector control method for an alternating-current motor, according to claim 3, wherein when a direct current or a direct-current voltage is applied to the alternating-current motor, and a secondary current flowing at the application time is employed to reevaluate the rotational direction and the velocity of the alternating-current motor, the velocity is estimated that the upper limit value for an estimated value is lower by a designated velocity value than the velocity is previously estimated to be, or is equal to the final output value of the frequency adjustment circuit, a frequency that corresponds to the estimated value is set to the frequency adjustment circuit, and the alternating-current motor is started.

5. A sensorless vector control apparatus, for an alternating-current motor, comprising:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting thereof, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, and a direct current or a direct-current voltage is applied to the alternating-current motor in a free running state before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, and the frequency adjustment circuit matches an output frequency with the velocity of the alternating-current motor, the sensorless vector control apparatus, further comprising:

erroneous setup estimation member for estimating, based on the level of a current flowing in the alternating-current motor, that the rotational direction and the frequency designated for the frequency adjustment circuit deviate from the actual rotational direction and the actual velocity of the alternating-current motor.

6. The sensorless vector control apparatus, for an alternating-current motor, according to claim 5, wherein a case that the level of the current flowing in the alternating-current motor is continued for a designated period of time, at an equal to or higher than designated current level, is established as a reference that is used by the erroneous setup estimation member to estimate that the rotational direction and the frequency designated for the frequency adjustment circuit deviate from the actual rotational direction and the actual velocity of the alternating-current motor.

7. The sensorless vector control apparatus for an alternating-current motor, according to claim 5, wherein after the erroneous setup estimation member estimates a setup is incorrect, a restarting of the alternating-current motor is halted, a direct current or a direct-current voltage is again applied to the alternating-current motor, a secondary current, flowing at the application time, is employed to reevaluate, the rotational direction and the velocity of the alternating-current motor, a frequency that corresponds to the rotational direction and the velocity is again set to the frequency adjustment circuit, and the alternating-current motor is restarted.

8. The sensorless vector control method for an alternating-current motor, according to claim 7, wherein when a direct current or a direct-current voltage is applied to the alternating-current motor, and a secondary current flowing at the application time is employed to reevaluate the rotational direction and the velocity of the alternating-current motor, while estimating the velocity is such that the upper limit value for an estimated value is lower by a designated velocity value than the velocity is previously estimated to be, or is equal to the final output value of the frequency adjustment circuit, and a frequency that corresponds to the estimated value and starting the alternating-current motor is set for the frequency adjustment circuit.

9. A sensorless vector control method for an alternating-current motor, the sensorless vector control method employing:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting thereof, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, the sensorless vector control method comprising the steps of:

applying a direct current or a direct-current voltage to the alternating-current motor in a free running state for a set time before the alternating-current motor is started, estimating a rotational direction and a velocity for the alternating-current motor based on a secondary current that flows at the application time, setting a frequency that corresponds to the rotational direction and the velocity for a frequency adjustment circuit to activate the alternating-current motor, and matching the frequency adjustment circuit an output frequency with the velocity of the alternating-current motor, and setting, as a period of time for applying a direct current or a direct-current voltage, a greater value, either an estimated lower limit value for the alternating-current motor, or a value obtained based on a value designated as a secondary circuit time constant.

10. The sensorless vector control method for an alternating-current motor, according to claim 9, wherein when the frequency of a secondary current is not obtained during the period in which the direct current or the direct-current voltage is being applied, it is determined that the alternating-current motor is halted, and a predesignated lowest frequency or a zero frequency is transmitted to the frequency adjustment circuit.

11. A sensorless vector control apparatus, for an alternating-current motor, comprising:

a power converter, for outputting arbitrary power to the alternating-current motor, a current detection circuit, for detecting a current supplied to the alternating-current motor, a coordinate conversion circuit, for converting the current supplied to the alternating-current motor into an exciting current detection value and a torque current detection value and for outputting thereof, an exciting current control circuit, for controlling an exciting current directional voltage so as to match the exciting current instruction value with the exciting current detection value, a torque current control circuit, for controlling a torque current directional voltage so as to match the toque current instruction value with the torque current detection value, a V/f conversion circuit, for calculating an induction voltage for the alternating-current motor based on a given output frequency instruction, a phase angle operation circuit, for obtaining a phase angle by integrating the given output frequency instruction, and an output voltage operation circuit, for calculating a level and a phase for an output voltage based on voltage instructions that are output by the exciting current control circuit, the torque current control circuit and the V/f conversion circuit, wherein a phase angle, output by the phase angle operation circuit, is added to the level and the phase output by the output voltage operation circuit in order to regulate the switching of the power converter, a velocity detector and a voltage detector are not provided, a direct current or a direct-current voltage is applied to the alternating-current motor in a free running state for a set time before the alternating-current motor is started, a rotational direction and a velocity for the alternating-current motor are estimated based on a secondary current that flows at the application time, a frequency that corresponds to the rotational direction and the velocity are set for a frequency adjustment circuit to activate the alternating-current motor, the frequency adjustment circuit matches an output frequency with the velocity of the alternating-current motor, and a greater value, either an estimated lower limit value for the alternating-current motor, or a value obtained based on a value designated as a secondary circuit time constant is set as a period of time for applying a direct current or a direct-current voltage.

12. The sensorless vector control apparatus for an alternating-current motor, according to claim 11, wherein
when the frequency of a secondary current is not obtained during the period in which the direct current or the direct-current voltage is being applied,
it is determined that the alternating-current motor is halted, and
a predesignated lowest frequency or a zero frequency is transmitted to the frequency adjustment circuit.

13. A sensorless vector control method for an alternating-current motor,
the sensorless vector control method employing:
a power converter, for outputting power to an alternating-current motor, and
a current controller, for controlling a current output by the power converter based on a signal indicating a deviation between a current instruction signal and a detection signal for a current output by the power converter, wherein
a velocity detector and a voltage detector are not provided,
the sensorless vector control method comprising the steps of:
effecting current control by forcibly setting the current instruction signal to zero so as to reduce to zero a current in the alternating-current motor in a free running state,
calculating a level and a phase of a residual voltage in the alternating-current motor, and an angular velocity, based on an output voltage instruction signal obtained by employing a current output by the current controller,
estimating a rotational direction and velocity of the alternating-current motor in the free running state, and
determining a wait time until the current control is started with the current instruction signal value set to zero in accordance with a run-time frequency of the power converter before the free running state and a secondary circuit time constant of the alternating-current motor.

14. The sensorless vector control method for an alternating-current motor, according to claim 13, wherein
when the run-time frequency of the power converter before the free running state is entered is lower than an arbitrarily designated frequency,
the wait time until the current control is started with the current instruction signal value of zero is set to zero.

15. The sensorless vector control method for an alternating-current motor, according to claim 13, wherein
when an induction voltage of the alternating-current motor is so high that it is difficult to adjust a current in the alternating-current motor to zero,
the control for setting the current in the alternating-current motor to zero is halted,
an arbitrarily provided time-power converter is permitted to prepare switching so as to short-circuit three phases of an input to the alternating-current motor,
a damping force on the alternating-current motor is exerted,
the alternating-current motor is decelerated,
the current of the alternating-current motor is controlled again to zero, and
the rotational direction and the velocity of the alternating-current motor in the free running state are estimated.

16. A sensorless vector control apparatus for an alternating-current motor, comprising:
a power converter, for outputting power to an alternating-current motor, and
a current controller, for controlling a current output by the power converter based on a signal indicating a deviation between a current instruction signal and a detection signal for a current output by the power converter, wherein
a velocity detector and a voltage detector are not provided,
current control is effected by forcibly setting the current instruction signal to zero so as to reduce to zero a current in the alternating-current motor in a free running state, and
a level and a phase of a residual voltage in the alternating-current motor, and an angular velocity, are calculated based on an output voltage instruction signal obtained by employing, a current output by the current controller,
a rotational direction and velocity of the alternating-current motor in the free running state are estimated, and
a wait time until the current control is started with the current instruction signal value set to zero is determined in accordance with a run-time frequency of the power converter before the free running state and a secondary circuit time constant of the alternating-current motor.

17. The sensorless vector control apparatus for an alternating-current motor, according to claim 16, wherein
when the run-time frequency of the power converter before the free running state is entered is lower than an arbitrarily designated frequency,
the wait time until the current control is started with the current instruction signal value set to zero is set.

18. The sensorless vector control apparatus for an alternating-current motor, according to claim 16, wherein
when an induction voltage of the alternating-current motor is so high that it is difficult to adjust a current in the alternating-current motor to zero,
the control for setting the current in the alternating-current motor to zero is halted,
an arbitrarily provided time-power converter is permitted to prepare switching so as to short-circuit three phases of an input to the alternating-current motor,
a damping force on the alternating-current motor is exerted,
the alternating-current motor is decelerated,
the current of the alternating-current motor is controlled again to zero, and
the rotational direction and the velocity of the alternating-current motor in the free running state is estimated.

19. A sensorless vector control method for an alternating-current motor, employing:
a power converter, for outputting power to the alternating-current motor, and
a current controller, for controlling a current output by the power converter based on a signal indicating a deviation between a current instruction signal and a detection signal for a current output by the power converter, wherein
both a velocity detector and a voltage detector are not provided,
the sensorless vector control method comprising the steps of:
performing a current control by forcibly setting the current instruction signal to zero so as to reduce to zero a current in the alternating-current motor in a free running state, and
calculating a level and a phase of a residual voltage in the alternating-current motor and an angular velocity based on an output voltage instruction signal obtained by employing a current output by the current controller, and estimating a rotational direction and a velocity of the alternating-current motor in the free running state, the sensorless vector control method further comprising the step of:

when a process for reducing to zero the current in the alternating-current motor is to be preformed, reducing a scanning period for a current control process to less than that for a normal control process.

20. The sensorless vector control method for an alternating-current motor, according to claim 19, wherein when the process for reducing to zero the current in the alternating-current motor is to be preformed, the scanning period for the current control process is reduced to less than that for the normal control process, as well as a carrier frequency of the power converter is increased.

21. A sensorless vector control apparatus for an alternating-current motor, comprising:

a power converter, for outputting power to an alternating-current motor, and a current controller, for controlling a current output by the power converter based on a signal indicating a deviation between a current instruction signal and a detection signal for a current output by the power converter, wherein a current control is performed by forcibly setting the current instruction signal to zero so as to reduce to zero a current in the alternating-current motor in a free running state, a level and a phase of a residual voltage in the alternating-current motor and an angular velocity are calculated based on an output voltage instruction signal obtained by employing a current output by the current controller, and then, a rotational direction and a velocity of the alternating-current motor in the free running state are estimated, and both a velocity detector and a voltage detector are not provided, the sensorless vector control apparatus further comprising:

member for, when a process for reducing to zero the current in the alternating-current motor is to be preformed, reducing a scanning period for a current control process to less than that for a normal control process.

22. The sensorless vector control apparatus for an alternating-current motor, according to claim 21, further comprising:

member for, when the process for reducing to zero the current in the alternating-current motor is to be preformed, reducing the scanning period for the current control process to less than that for the normal control process, as well as increasing a carrier frequency of the power converter.

23. A sensorless vector control method for an alternating-current motor, the sensorless vector control method employing:

a power converter, for outputting power to an alternating-current motor, and a current controller, for controlling a current output by the power converter based on a signal indicating a deviation between a current instruction signal and a detection signal for a current output by the power converter, the sensorless vector control method comprising the steps of:

effecting current control by forcibly setting the current instruction signal to zero so as to reduce to zero a current in the alternating-current motor in a free running state, when the current instruction signal, which is calculated by using a current output by the current controller, is lower than an arbitrarily designated voltage level, halting current control, transmitting a direct current instruction at an arbitrary level for a designated period of time, thereafter transmitting a current instruction at an arbitrary level in a direction with a phase 180° different from the direction in which the direct-current voltage is transmitted, and performing the current control again during a designated period of time, wherein a velocity estimation circuit detects a frequency component that appears in a current detection value and a phase relationship thereof, estimates the frequency component as a velocity of the alternating-current motor, and employs the phase relationship to estimate a rotational direction of the alternating-current motor both a velocity detector and a voltage detector are not provided, the sensorless vector control method further comprising the step of:

when the velocity and the rotational direction of the alternating-current motor are estimated by providing a direct current instruction for the alternating-current motor, reducing a scanning time period for a current control process to less than that for a normal control process.

24. The sensorless vector control method for an alternating-current motor, according to claim 23, further comprising the steps of:

when the velocity and the rotational direction of the alternating-current motor are estimated by providing a direct current instruction for the alternating-current motor, reducing a scanning period of time for a current control process to less than that for a normal control process, as well as increasing a carrier frequency of the power converter.

25. The sensorless vector control method for an alternating-current motor, according to claim 23, further comprising the steps of:

when the velocity and the rotational direction of the alternating-current motor are estimated by providing a direct current instruction for the alternating-current motor, reducing a scanning period of time for a current control process to less than that for a normal control process, as well as employing a current detector that is different from that used for the normal control process and that is so sensitive a small current is detected.

26. A sensorless vector control apparatus for an alternating-current motor, comprising:

a power converter, for outputting power to an alternating-current motor, and a current controller, for controlling a current output by the power converter based on a signal indicating a deviation between a current instruction signal and a detection signal for a current output by the power converter, wherein both a velocity detector and a voltage detector are not provided, current control is effected by forcibly setting the current instruction signal to zero so as to reduce to zero a current in the alternating-current motor in a free running state, when the output voltage instruction signal, which is calculated by using a current output by the current controller at this time, is lower than an arbitrarily designated voltage level, current control is halted, and a direct current instruction is transmitted at an arbitrary level in an arbitrary direction for a designated period of time, thereafter, a current instruction is transmitted at an arbitrary level in a direction with a phase 180° different from the direction in which the direct-current voltage is transmitted, and the current control is performed again during a designated period of time, and a velocity estimation circuit detects a frequency component that appears in a current detection value and a phase relationship thereof, estimates the frequency component as a velocity of the alternating-current motor, and employs the phase relationship to estimate a rotational direction of the alternating-current motor, the sensorless vector control apparatus further comprising:

member for reducing a scanning time period for a current control process to less than that for a normal control process, when the velocity and the rotational direction of the alternating-current motor are estimated by providing a direct current instruction for the alternating-current motor.

27. The sensorless vector control apparatus for an alternating-current motor, according to claim 26, further comprising:
when the velocity and the rotational direction of the alternating-current motor are estimated by providing a direct current instruction for the alternating-current motor,
member for reducing a scanning period of time for a current control process to less than that for a normal control process, as well as increasing a carrier frequency of the power converter.

28. The sensorless vector control method for an alternating-current motor, according to claim 26, further comprising:
when the velocity and the rotational direction of the alternating-current motor are estimated by providing a direct current instruction for the alternating-current motor,
a current detector for reducing a scanning period of time for a current control process to less than that for a normal control process, as well as employing a current detector that is different from that used for the normal control process and that is so sensitive a small current is detected.

* * * * *